US012779933B2

(12) United States Patent
Schoeneman et al.

(10) Patent No.: US 12,779,933 B2
(45) Date of Patent: Nov. 3, 2026

(54) HYDRAULIC ARCHITECTURE FOR ELECTRIFIED VEHICLE INCLUDING HEATING AND COOLING

(71) Applicant: Ford Global Technologies, LLC, Dearborn, MI (US)

(72) Inventors: Christian Brent Schoeneman, Southgate, MI (US); Jeffrey Paul Brown, Farmington Hills, MI (US); Todd Louis Wenzel, Detroit, MI (US); Ravi Gopal, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 276 days.

(21) Appl. No.: 18/231,952

(22) Filed: Aug. 9, 2023

(65) Prior Publication Data

US 2025/0050703 A1 Feb. 13, 2025

(51) Int. Cl.

| | |
|---|---|
| ***B60H 1/00*** | (2006.01) |
| ***B60H 1/14*** | (2006.01) |
| ***B60H 1/32*** | (2006.01) |

(52) U.S. Cl.

CPC ..... *B60H 1/00278* (2013.01); *B60H 1/00392* (2013.01); *B60H 1/00885* (2013.01); *B60H 1/143* (2013.01); *B60H 1/32284* (2019.05); *B60H 2001/00307* (2013.01); *B60H 2001/00928* (2013.01); *Y02E 60/10* (2013.01)

(58) Field of Classification Search

CPC ............ B60H 1/00278; B60H 1/00392; B60H 1/00885; B60H 1/143; B60H 1/32284; B60H 2001/00307; B60H 2001/00928; B60H 1/3228; Y02E 60/10; B60K 11/02

See application file for complete search history.

(56) References Cited

U.S. PATENT DOCUMENTS

| | | | | |
|---|---|---|---|---|
| 10,543,734 | B2 * | 1/2020 | Porras | H01M 10/625 |
| 10,697,681 | B2 | 6/2020 | He et al. | |
| 10,850,590 | B2 * | 12/2020 | Lee | B60H 1/00885 |
| 11,021,041 | B2 | 6/2021 | He et al. | |
| 11,059,351 | B2 * | 7/2021 | Zenner | B60H 1/00385 |
| 11,390,137 | B2 * | 7/2022 | Mackenzie | H01M 10/613 |
| 11,446,978 | B2 * | 9/2022 | Bara | B60H 1/32284 |
| 11,506,306 | B2 * | 11/2022 | Schoeneman | F16K 49/005 |
| 11,541,715 | B2 | 1/2023 | Huang et al. | |
| 11,560,042 | B2 | 1/2023 | Brown et al. | |
| 11,862,779 | B2 * | 1/2024 | Ernst | H01M 10/625 |
| 11,898,657 | B2 * | 2/2024 | Schoeneman | F01P 7/165 |
| 11,951,799 | B2 * | 4/2024 | Mackenzie | H01M 10/625 |
| 12,139,886 | B2 * | 11/2024 | Whiteman | B60L 1/003 |
| 12,308,413 | B2 * | 5/2025 | Ernst | H01M 10/625 |
| 12,330,472 | B2 * | 6/2025 | Giunta | B60K 11/02 |
| 2009/0317697 | A1 * | 12/2009 | Dogariu | B60H 1/00278 429/62 |
| 2017/0087957 | A1 * | 3/2017 | Blatchley | B60H 1/321 |
| 2020/0254844 | A1 * | 8/2020 | Lopez Hernandez | F01P 11/028 |

(Continued)

*Primary Examiner* — Ljiljana V. Ciric

(74) *Attorney, Agent, or Firm* — Vichit Chea; Carlson, Gaskey & Olds, P.C.

(57) ABSTRACT

A system includes a coolant system and a refrigerant system. The coolant system is in fluid communication with power electronics, a battery pack, and a cabin. The refrigerant system only interfaces with coolant from the coolant system, and wherein all cabin heat exchange and all refrigerant heat exchange is through coolant.

18 Claims, 24 Drawing Sheets

(56) References Cited

U.S. PATENT DOCUMENTS

| | | | |
|---|---|---|---|
| 2020/0398636 A1 | 12/2020 | He et al. | |
| 2021/0370745 A1* | 12/2021 | Carlson | B60L 1/003 |
| 2022/0355645 A1* | 11/2022 | Jeong | B60H 1/00664 |
| 2022/0412611 A1 | 12/2022 | Brown et al. | |
| 2023/0033890 A1 | 2/2023 | Gopal et al. | |
| 2023/0074313 A1 | 3/2023 | Mazaira et al. | |
| 2023/0109595 A1 | 4/2023 | Brown et al. | |
| 2023/0158854 A1 | 5/2023 | Huang et al. | |
| 2025/0050703 A1* | 2/2025 | Schoeneman | B60H 1/00278 |

* cited by examiner

CVTMS COOLANT VALVE STATES

| AMBIENT CONDITION | CABIN [STATE,NEED] | BATTERY [STATE,NEED] | P/E [STATE,NEED] | VALVE STATE GROUP | MODE NAME | POWER ELECTRONICS >HEAT TO | LTR <HEAT FROM,>HEAT TO |
|---|---|---|---|---|---|---|---|
| ALL | - | - | - | A | FAIL SAFE, FILL, DEAERATE | > LTR | <PE, BATTERY > AMBIENT |
| HOT 30C+ | - | HOT 10C | HOT 70C | B | DCFC, NO CABIN | > LTR | <PE, WCC > AMBIENT |
| HOT 30C+ | HOT 0C | - | HOT 70C | N | AC PULL DOWN, RECIRCULATE BATTERY | > LTR | <PE, WCC > AMBIENT |
| HOT 30C+ | HOT 0C | HOT 10C | HOT 70C | C | CABIN AND BATTERY COOLING | > LTR | <PE, WCC > AMBIENT |
| HOT 30C+ | HOT 0C | HOT 10C | HOT 70C | Q | CABIN AND BATTERY COOLING | > LTR | <PE, WCC > AMBIENT |
| MILD 15-30C | HOT 0C | WARM 30C | HOT 70C | D | CABIN-ACTIVE, BATTERY-PASSIVE COOLING | > LTR | <PE, BATTERY, WCC > AMBIENT |
| MILD/HUMID 0-20C | COOL 0C & 70C | WARM 30C | WARM -C | | DUHUMIDIFICATION, BATTERY COOLING | > LTR | <PE, WCC > AMBIENT |
| MILD/HUMID 0-20C | COOL 0C & 70C | COLD 20C | WARM -C | E | DUHUMIDIFICATION, BATTERY HEATING w/PE WASTE HEAT | > BATTERY | OFF (LTR BYPASS) |
| COLD <20C | COOL 0C & 70C | WARM 10C | WARM -C | | CABIN HEATING w/BATTERY COOLING/ENERGY RECOVERY | > BATTERY, CHILLER 2 | OFF (LTR BYPASS) |
| COLD <20C | COLD 70C | COLD 20C | COLD -C | H | CABIN AND BATTERY HEATING VIA HEAT PUMP | > CHILLER 1 &2, LTR | < AMBIENT > PE, CHILLER 1 & 2 |
| COLD <20C | COLD 70C | COOL -C | COLD -C | P | CABIN HEATING VIA HEAT PUMP, BATTERY HEATING w/PE WASTE HEAT OR e-DRIVE TORQUE LOSS | > BATTERY | < AMBIENT > CHILLER 1 & 2 |

FIG.5-1

| 1-BOX | | | 2-BOX | | | |
|---|---|---|---|---|---|---|
| WCC 1 >HEAT TO | CHILLER 1a <HEAT FROM | CHILLER 1b <HEAT FROM | WCC 1 & 2 >HEAT TO | CHILLER 1a <HEAT FROM | CHILLER 1b <HEAT FROM | CHILLER 2a <HEAT FROM |
| FLOW ONLY (NO HEAT) | FLOW ONLY (NO HEAT) | FLOW ONLY (NO HEAT) | FLOW ONLY (NO HEAT) | FLOW ONLY (NO HEAT) | FLOW ONLY (NO HEAT) | FLOW ONLY (NO HEAT) |
| LTR | BATTERY | BATTERY | LTR | BATTERY | BATTERY | BATTERY |
| LTR | COOLER CORE | COOLER CORE | LTR | COOLER CORE | COOLER CORE | COOLER CORE |
| LTR | COOLER CORE | BATTERY | LTR | COOLER CORE | COOLER CORE | FLOW ONLY OR BATTERY |
| LTR | BATTERY | COOLER CORE | LTR | BATTERY | BATTERY | COOLER CORE |
| LTR | COOLER CORE | FLOW ONLY OR BATTERY | LTR | COOLER CORE | COOLER CORE | FLOW ONLY OR BATTERY |
| HEATER CORE | COOLER CORE | FLOW ONLY OR BATTERY | HEATER CORE | COOLER CORE | COOLER CORE | FLOW ONLY OR BATTERY |
| HEATER CORE | COOLER CORE | FLOW ONLY (NO HEAT) | HEATER CORE | COOLER CORE | COOLER CORE | FLOW ONLY (NO HEAT) |
| HEATER CORE | FLOW ONLY (NO HEAT) | BATTERY | HEATER CORE, (WCC2 ONLY) | FLOW ONLY (NO HEAT) | FLOW ONLY (NO HEAT) | BATTERY |
| HEATER CORE, BATTERY | LTR, PE | LTR, PE | HEATER CORE, BATTERY | LTR, PE | LTR, PE | LTR, PE |
| HEATER CORE | LTR | LTR | HEATER CORE | LTR | LTR | LTR |

FIG.5-2

HYDRAULIC ARCHITECTURE FOR ELECTRIFIED VEHICLE INCLUDING HEATING AND COOLING

TECHNICAL FIELD

This disclosure relates to a hydraulic architecture for a thermal management system for an electrified vehicle, and more particularly to a hydraulic architecture where all heat exchange between vehicle components, cabin, and ambient air is through coolant.

BACKGROUND

An electrified vehicle includes a high voltage traction battery pack that powers electric machines and other electrical loads of the electrified vehicle. It is challenging to manage heat transfer between different groups of components in the electrified vehicle without the addition of a significant number of heat exchangers and/or a plurality of valve systems.

SUMMARY

A system according to an exemplary aspect of the present disclosure includes, among other things: a coolant system that is in fluid communication with power electronics, a battery pack, and a cabin; and a refrigerant system that only interfaces with coolant from the coolant system, and wherein all cabin heat exchange and all refrigerant heat exchange is through coolant.

In a further non-limiting embodiment of the foregoing system, the system includes a valve that is associated with a first configuration or a second configuration, and wherein: in the first configuration, the valve is in fluid communication with the battery pack, the power electronics, a cooler core, a heater core, at least a first chiller and a second chiller, at least one water cooled condenser, and a low temperature radiator; and in the second configuration, the valve is in fluid communication with the battery pack, the power electronics, a cooler core, a heater core, at least a first chiller, a second chiller and a third chiller, at least a first water cooled condenser and a second water cooled condenser, and a low temperature radiator.

In a further non-limiting embodiment of any of the foregoing systems, the valve comprises the only valve that is used in the first configuration and the second configuration.

In a further non-limiting embodiment of any of the foregoing systems, the valve is operational in a plurality of different valve states, and including a controller that controls the valve to manage heat transfer for the plurality of different valve states based on input from a plurality of sensors.

In a further non-limiting embodiment of any of the foregoing systems, one of the plurality of different valve states comprises a DC fast charge mode when the cabin does not have a request for heating or cooling, and wherein: the first chiller and the second chiller are used to cool the battery pack via the refrigerant system when in the first configuration, and the first chiller, the second chiller and the third chiller are used to cool the battery pack via the refrigerant system when in the second configuration.

In a further non-limiting embodiment of any of the foregoing systems, one of the plurality of different valve states comprises a cabin cooling and battery cooling mode, and wherein: one of the first chiller and the second chiller is used to cool the battery pack and another of the first chiller and the second chiller is used to cool the cabin via the cooler core when in the first configuration; and two of the first chiller, the second chiller and the third chiller are used to cool the cabin via the cooler core, and a remaining chiller of the first chiller, the second chiller and the third chiller is used to cool the battery pack when in the second configuration.

In a further non-limiting embodiment of any of the foregoing systems, one of the plurality of different valve states comprises a cabin cooling and battery cooling mode, and wherein: one of the first chiller and the second chiller is used to cool the battery pack and another of the first chiller and the second chiller is used to cool the cabin via the cooler core when in the first configuration; and two of the first chiller, the second chiller and the third chiller are used to cool the battery pack, and a remaining chiller of the first chiller, the second chiller and the third chiller is used to cool the cabin via the cooler core when in the second configuration.

In a further non-limiting embodiment of any of the foregoing systems, one of the plurality of different valve states comprises a cabin cooling and battery recirculation mode, and wherein: the first chiller and the second chiller are used to cool the cabin via the cooler core when in the first configuration; and the first chiller, the second chiller, and the third chiller are used to cool the cabin via the cooler core when in the second configuration.

In a further non-limiting embodiment of any of the foregoing systems, one of the plurality of different valve states comprises a cabin-active cooling and a battery-passive cooling mode, and wherein: the low temperature radiator is used to cool the battery pack and power electronics, one of the first chiller and second chiller is used to cool the power electronics and battery pack, and the other of the first chiller and the second chiller is used to cool the cabin when in the first configuration; and the low temperature radiator is used to cool the battery pack and power electronics, two of the first chiller, the second chiller and the third chiller are used to cool the cabin via the cooler core, a remaining chiller of the first chiller, the second chiller and the third chiller is used to cool the power electronics and battery pack when in the second configuration.

In a further non-limiting embodiment of any of the foregoing systems, one of the plurality of different valve states comprises a dehumidification with battery heating/cooling or cabin heating with battery cooling, and wherein:

when in the first configuration, the low temperature radiator is used to cool the battery and power electronics, one of the first chiller and second chiller is used to cool the power electronics and battery, heat from the power electronics, the battery, and the low temperature radiator is transferred from at least one of the first and second chillers to the water cooled condenser through the refrigerant system to warm the cabin if needed, the cabin is dehumidified by being cooled by one of the first and second chillers if needed, and the heater core is used simultaneously via heat from the water cooled condenser to compensate for cabin cooling if needed; and when in the second configuration the low temperature radiator is used to cool the battery and power electronics, one of the first chiller and second chiller is used to cool the power electronics and battery, heat from the power electronics, the battery, and the low temperature radiator is transferred from at least one of the first and second chillers to the water cooled condenser through the refrigerant system to warm the cabin if needed, the cabin is dehumidified by being cooled by two of the first, second and third chillers if needed, and the heater core is used simultaneously via heat from the water cooled condenser to compensate for cabin cooling if needed.

In a further non-limiting embodiment of any of the foregoing systems, one of the plurality of different valve states comprises at least a battery heating and a cabin heating mode if predetermined conditions are satisfied, and wherein: heat is transferred directly from a PTC heater to the battery, or heat recovered from ambient air through the low temperature radiator and power electronics waste heat is transferred through the first and second chillers to the at least one water cooled condenser and then to the heater core and battery when in the first configuration; and heat is transferred directly from the PTC heater, or heat recovered from ambient air through the low temperature radiator and power electronics waste heat is transferred through the first, second and third chillers to the first and second water cooled condensers and then to the heater core and battery, when in the second configuration.

In a further non-limiting embodiment of any of the foregoing systems, one of the plurality of different valve states comprises cabin and battery heating mode, and wherein: heat from the power electronics circuit to directly heat the battery, heat recovered from ambient air through the low temperature radiator and power electronics waste heat is transferred through the first and second chillers to the at least one water cooled condenser and then to the heater core when in the first configuration; and heat from the power electronics circuit to directly heat the battery, heat recovered from ambient air through the low temperature radiator and power electronics waste heat is transferred through the first, second and third chillers to the first and second water cooled condensers and then to the heater core when in the second configuration.

In a further non-limiting embodiment of any of the foregoing systems, the system includes a plurality of pumps comprising at least a first pump positioned immediately downstream of the battery, a second pump positioned immediately downstream of the heater core, a third pump positioned immediately downstream of the low temperature radiator, and a fourth pump positioned immediately downstream of the cooler core.

A method according to another exemplary aspect of the present disclosure includes, among other things: providing a coolant system that is in fluid communication with power electronics, a battery pack, and a cabin; providing a refrigeration system that only interfaces with coolant from the coolant system; conducting all cabin heat exchange through the coolant; and conducting all refrigerant heat exchange through the coolant.

In a further non-limiting embodiment of the foregoing method, the method includes associating a valve that a first configuration or a second configuration, and further including: in the first configuration, fluidly communicating the valve with the battery pack, the power electronics, a cooler core, a heater core, at least a first chiller and a second chiller, at least one water cooled condenser, and a low temperature radiator; and in the second configuration, fluidly communicating the valve with the battery pack, the power electronics, a cooler core, a heater core, at least a first chiller, a second chiller and a third chiller, at least a first water cooled condenser and a second water cooled condenser, and a low temperature radiator.

In a further non-limiting embodiment of any of the foregoing methods, the valve comprises the only valve that is used in the first configuration and the second configuration.

In a further non-limiting embodiment of any of the foregoing methods, the method includes positioning at least a first pump immediately downstream of the battery, a second pump immediately downstream of the heater core, a third pump immediately downstream of the low temperature radiator, and a fourth pump immediately downstream of the cooler core.

In a further non-limiting embodiment of any of the foregoing methods, the valve is operational in a plurality of different valve states, and the method includes controlling the valve to manage heat transfer for the plurality of different valve states based on input from a plurality of sensors.

In a further non-limiting embodiment of any of the foregoing methods, one of the plurality of different valve states comprises at least a battery heating and a cabin heating mode if predetermined conditions are satisfied, and the method includes: when in the first configuration, transferring heat directly from a PTC heater to the battery, or transferring heat recovered from ambient air through the low temperature radiator and power electronics waste heat through the first and second chillers to the at least one water cooled condenser and then to the heater core and battery; and when in the second configuration, transferring heat directly from the PTC heater to the battery, or transferring heat recovered from ambient air through the low temperature radiator and power electronics waste heat through the first, second and third chillers to the first and second water cooled condensers and then to the heater core and battery.

In a further non-limiting embodiment of any of the foregoing methods, one of the plurality of different valve states comprises cabin and battery heating mode, and the method includes: when in the first configuration, using heat from the power electronics circuit to directly heat the battery, and transferring heat recovered from ambient air through the low temperature radiator and power electronics waste heat through the first and second chillers to the at least one water cooled condenser and then to the heater core; and when in the second configuration, using heat from the power electronics circuit to directly heat the battery, and transferring heat recovered from ambient air through the low temperature radiator and power electronics waste heat through the first, second and third chillers to the first and second water cooled condensers and then to the heater core.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 5-1 is a first portion of a chart detailing a plurality of operational modes and valve states for the first and second configurations. FIG. 5-2 is a remaining portion of the chart of FIG. 5-1.

DETAILED DESCRIPTION

This disclosure details a hydraulic architecture for a thermal management system for an electrified vehicle, and more particularly to a hydraulic architecture where all heat exchange is through coolant.

Figure 1:
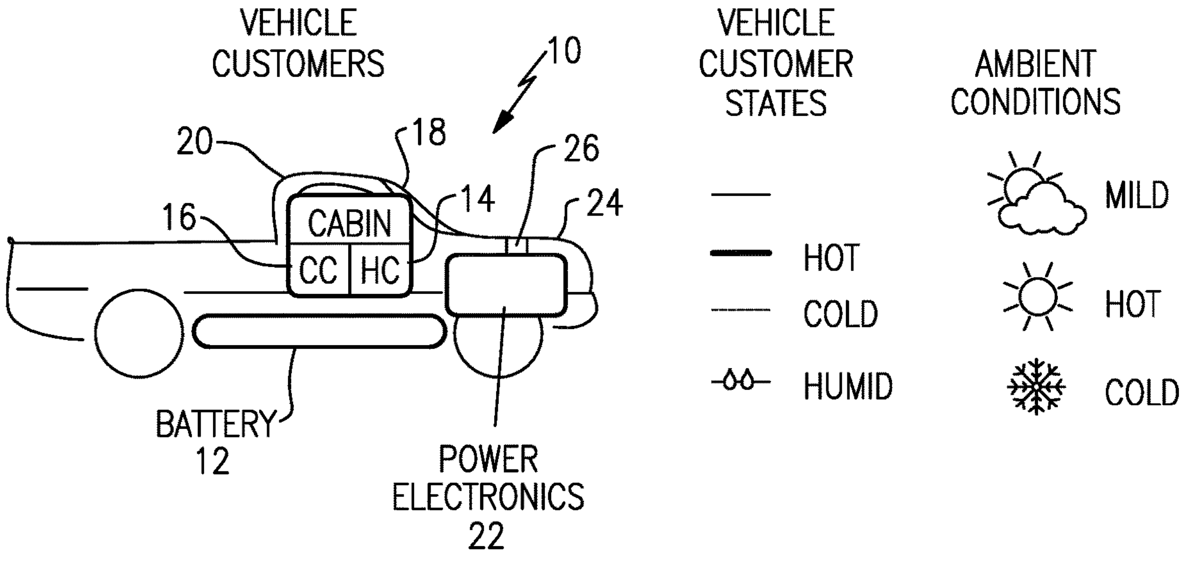
FIG. 1 is a schematic representation of a vehicle including a thermal management system according to the disclosure.

FIG. 1 schematically illustrates a an electrified vehicle 10. The vehicle 10 can comprise a hybrid electric vehicle (HEV), a plug-in hybrid electric vehicle (PHEV), a battery electric vehicle (BEV), etc. In one example, a battery pack 12 is located under a floor of the vehicle; however, the battery pack 12 could be at other locations within the vehicle. In one example, the battery pack 12 is a high voltage traction battery that includes a plurality of battery arrays (i.e., battery assemblies or groupings of battery cells) capable of outputting electrical power to electrical loads of the electrified vehicle 10 to propel the wheels an run vehicle operational systems as needed.

In one example, a cabin cooler core 14 and a heater core 16 are located in a vehicle HVAC module 18. The vehicle 10 may also have a second cooler core and heater core located in a rear of a cabin 20 as an auxiliary climate control system. In one example, power electronics 22 are located under a hood 24 of the vehicle. The power electronics 22 include components such as a charger, DC/DC converter, ISC, drive motor, water cooled transmission cooler, on-board generator, PTC heater, etc. In one example, refrigeration system(s) 26 are also located under the hood 24. In one disclose example, the systems 26 comprise a single box refrigerant system 28 (FIG. 3) or a dual box refrigerant system 30 (FIG. 4). In one example, the single box refrigerant system 28 includes an electric compressor, two chillers (refrigerant to coolant heat exchangers) which absorb heat from coolant into the refrigerant, a water cooled condenser (refrigerant to coolant heat exchangers) which reject heat from refrigerant to coolant, and various refrigerant valves and temperature/pressure sensors. In one example, the dual box refrigerant system 30 includes the same components as the single box refrigerant system 28, but may include only one chiller and one WCC, and may have unique capacity and efficiency from the single box refrigerant system 28. These configurations will be discussed in greater detail below. In one example, the vehicle 10 additionally includes cooling system main components such as pumps, valve(s), low temperature radiator (LTR) with or without a bypass valve, temperature sensors, low temperature radiator, radiator fan, hoses, etc.

Figure 2:
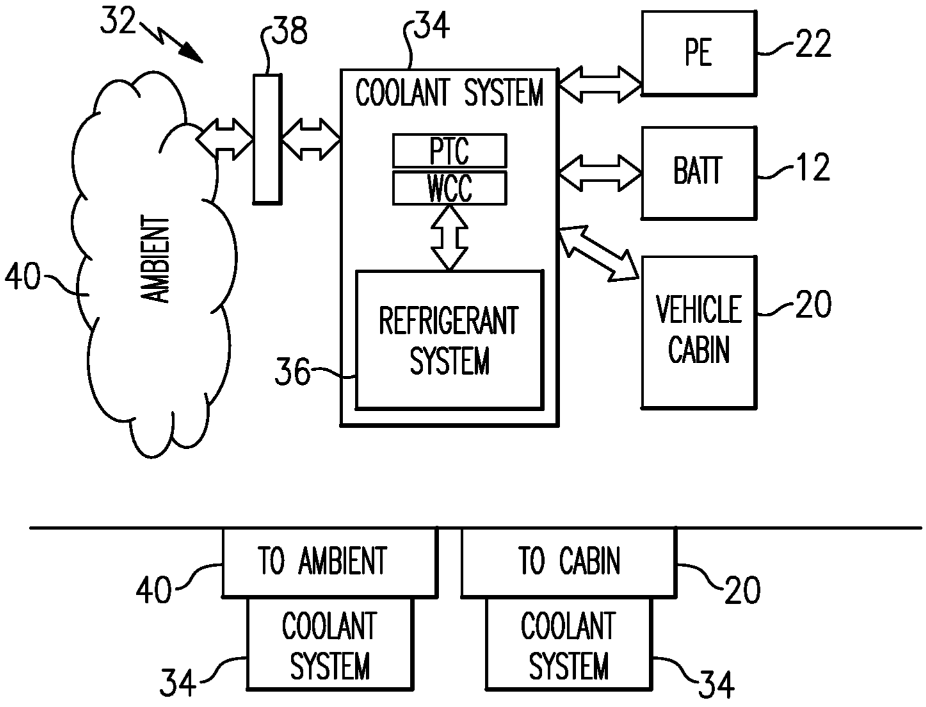
FIG. 2 is a schematic diagram illustrating indirect refrigerant heat to ambient with coolant only distribution.

FIG. 2 shows one example of a thermal management system 32 that includes a coolant system 34 and a refrigerant system 36 that interface with the power electronics 22, the battery 12, the cabin 20, and a coolant based LTR 38 that exhausts and draws from ambient 40. In one disclosed configuration, the refrigerant system 36 only interfaces with coolant, e.g. glycol, such that all cabin heat exchange is through coolant and all refrigerant heat exchange is through coolant. This allows each system to transfer heat to where ever it is needed. It also allows for heat to be absorbed from the atmosphere for a heat pump to warm the cabin 20 and/or battery 12.

The subject disclosure provides various hydraulic modes to support vehicle function using a compact refrigerant system (RTMS) with heat transferred to and from the system only via coolant. In one example, BEV cooling architecture and hydraulic modes utilize coolant as a working medium for thermal transfer to and from components for use in power electronics 22, battery 12, and cabin 20 heating and cooling through one or more valves.

BEV architectures usually employ a complex refrigerant and complex coolant system to transfer heat to and from electrified components, and to and from the cabin 20. In order to reduce the quantity of components, increase the efficiency, and better the functionality of heat transfer within the vehicle 10, the submit disclosure provides a unique hydraulic architecture. The subject system has a reduction of components, complexity, expense, and mass of the refrigerant system. The subject thermal management system does all required heat exchange between the electrified components and the cabin, transferring heat to and from the simplified refrigerant system as required. In one example, the system uses indirect coolant heat exchangers to the refrigerant system, and direct heat exchangers with vehicle components, cabin, and ambient.

In one disclosed example, the system has an initial series of modes required for heat transfer between components and subsystems. The system can then switch between the various moves to achieve the desired heating/cooling functions as needed. The benefits of this system include a substantially simplified refrigerant system which is filled just prior to final vehicle assembly, thus reducing cycle time, rework, and tooling at the final assembly plant. Additional benefits include component count reduction, modularity across vehicles, and better facilitation of thermal responses of the vehicle under various conditions.

In one example, the disclosed architecture allows for the use of one refrigerant systems or two refrigerant systems working together to increase the functional capability of the thermal system, e.g. the single box refrigerant system 28 or the dual box refrigerant system 30. The refrigerant systems may be selected to independently transfer heat from one another or to various systems/components based on the efficiency and loading of the two refrigerant boxes. Each refrigerant box may get a thermal load that is different. The modes disclosed herein describe how the hydraulic system takes advantage of each refrigerant box efficiency based on its thermal load. In vehicles with a single refrigerant box system 28, the same valve(s) can be used as is in the dual box refrigerant system 30, which allows for hardware and function commonality.

As discussed above, coolant is used as the sole heat transfer mechanism across vehicle components. In electrified vehicles, the heat captured from various components is utilized within the refrigerant system to take advantage of the coefficient of performance (COP) of the refrigerant system reducing demand of heat generation from components with a lower COP thus improving the range of the vehicle.

Figure 3:
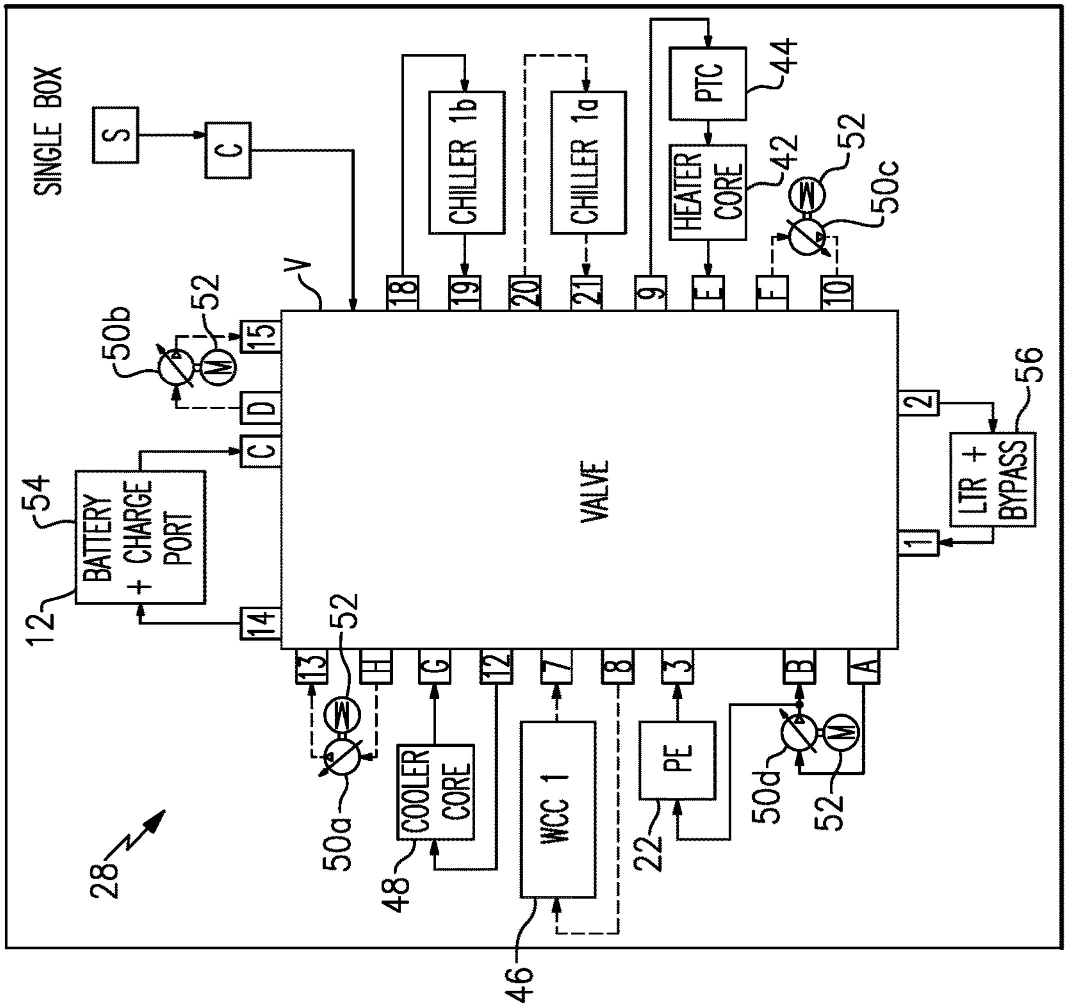
FIG. 3 is a schematic view of a valve as used with a first configuration of the thermal management system.
Figure 4:
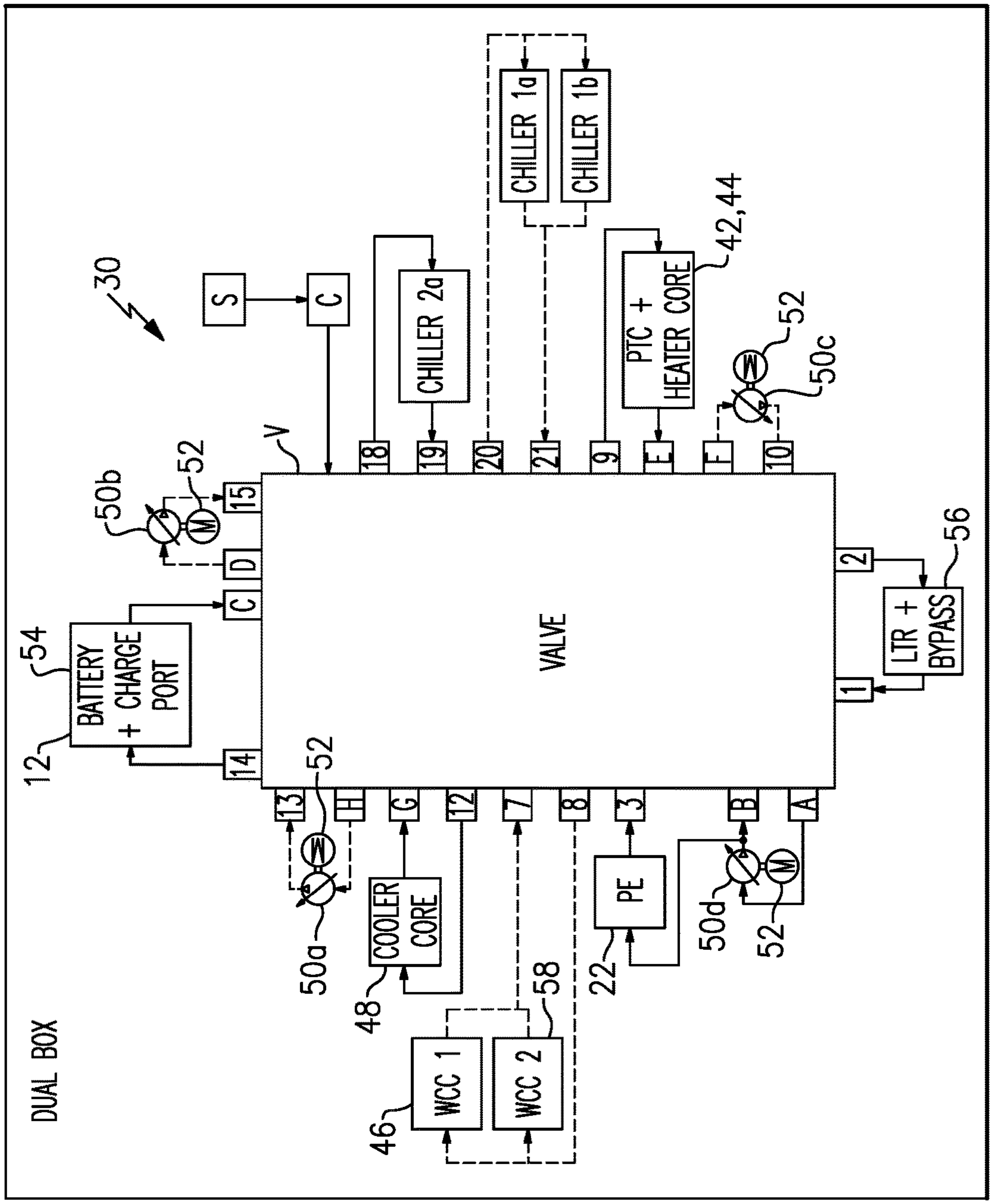
FIG. 4 is a schematic view of a valve as used with a second configuration of the thermal management system.

FIG. 3 shows one example of the single box refrigerant system 28. In this example, the system includes a valve comprising a valve body V that is associated with first 1*a* and second 1*b* chillers, a heater core 42, a PTC heater 44, power electronics 22, a water cooled condenser (WCC) 46, and a cooler core 48. The valve body V of the system also is also associated with one or more pumps 50 with associated motors 52. In the example shown in FIG. 3, there are four pumps 50*a-d* and motors 52. The valve body V of the system also is associated with a battery charge port 54 and a low temperature radiator 56 and bypass. FIG. 4 shows one example of the dual box refrigerant system 30. This example includes the same components as single box refrigerant system 28 but additionally includes an additional chiller 2*a* and a second WCC 58 that are associated with the valve body V.

In one example, the power electronics 22 has a maximum of 70 degrees C. inlet temperature to most components such as the charger, DC/DC converter, ISCs, oil coolers, etc. In one example, the battery pack 12 has a maximum inlet temperature of 40 degrees C. to 50 degrees C., and comprises the battery and possibly other electrified components requiring cooling such as an AV computer, for example. In one example, the WCC 46, 58 comprises a heat exchanger that transfers heat to and from refrigerant system 36 and coolant. In one example, the chillers 1*a*, 1*b*, 2*a* comprise a heat exchanger that transfers heat to and from refrigerant system 36 and coolant. In one example, the LTR 56 comprises a heat exchanger that transfers heat to and from coolant and the ambient air 40. In one example, the cooler core 48 comprises a heat exchanger that absorbs heat from the cabin 20 and transfers to coolant. In one example, the heater core 42 comprises a heat exchanger that rejects heat.

The valve body V is subject to a plurality of different state usages. In one example, these valve states include at least:

State A: fill, deaeration

State B: DCFC-direct current fast charge-(all chillers to battery)

State C: cabin & battery cooling, independently

State Q: cabin & battery cooling (RTMS-swap)

State N: AC pull down (all chillers to cabin)

State D: cabin cooling, battery passive cooling

State E: dehumidification/heat recovery from PE & battery

State H: stationary battery heating

State P: cabin & battery Heating, independently.

The mode definition drives what components and systems are required to transfer heat at various vehicle drive cycles under various ambient temperatures.

In one example, the thermal management system 32 has three main "customers" including the battery 12, the power electronics 22, and the cabin 20. These customers experience various states including a fill/maintenance state, a hot state, a cold state, and a humid state, for example. The system is also subject to various ambient conditions such as hot, cold, and mild, for example. FIG. 5 is a table that shows the various architectures for each configuration for the different modes, states, and ambient conditions. This table shows all of the modes described above and defines the ambient temperatures of which components transfer heat.

In one example, the valve of the thermal management system 32 comprises the only valve used in each systems 28, 30, such that a single valve body V is able to achieve the different operational functions of each valve state.

The valve V is controlled by a system controller C (FIGS. 3-4) to control flow through a plurality of ports as will be described below. The controller C receives data from various sensors S, which can include temperature sensors, speed sensors, flow sensors, etc. for example. The system controller C analyzes the sensor data and controls the valve V in response to various vehicle operational conditions as will be explained below.

The controller C can include a processor, memory, and one or more input and/or output (I/O) device interface(s) that are communicatively coupled via a local interface including one or more buses and/or other wired or wireless connections, for example. The controller C may be a hardware device for executing software, and can be a custom made or commercially available processor, a central processing unit, an auxiliary processor among several processors associated with the computing device, or generally any device for executing software instructions. The software in the memory may include one or more separate programs, each of which includes an ordered listing of executable instructions for implementing logical functions. The controller C can be configured to execute software stored within the memory, to communicate data to and from the memory, and to generally control operations of the computing device pursuant to the software. Software in memory, in whole or in part, is read by the processor, perhaps buffered within the processor, and then executed.

Figure 6A:
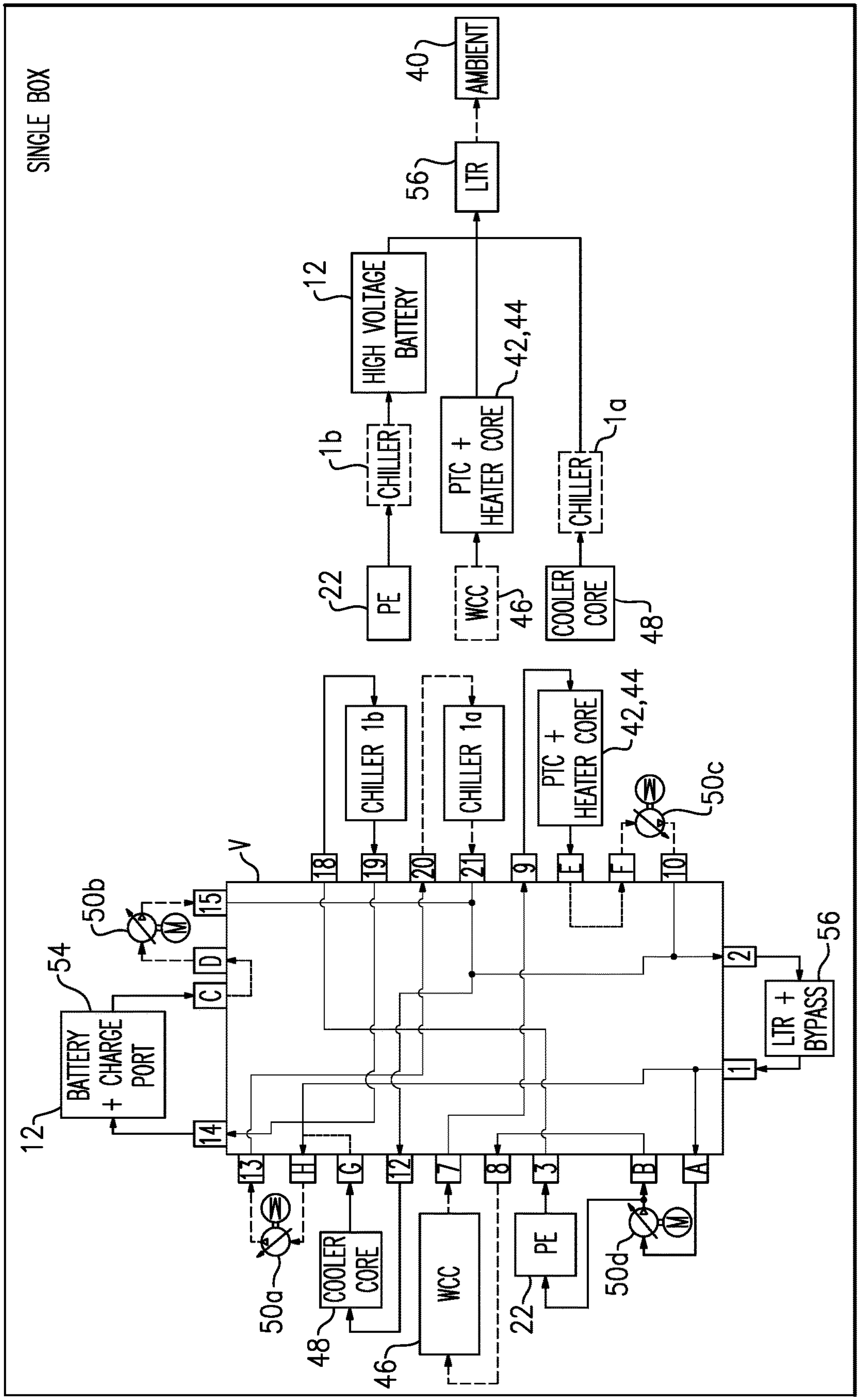
FIG. 6A is an example of one valve state for the first configuration.
Figure 6B:
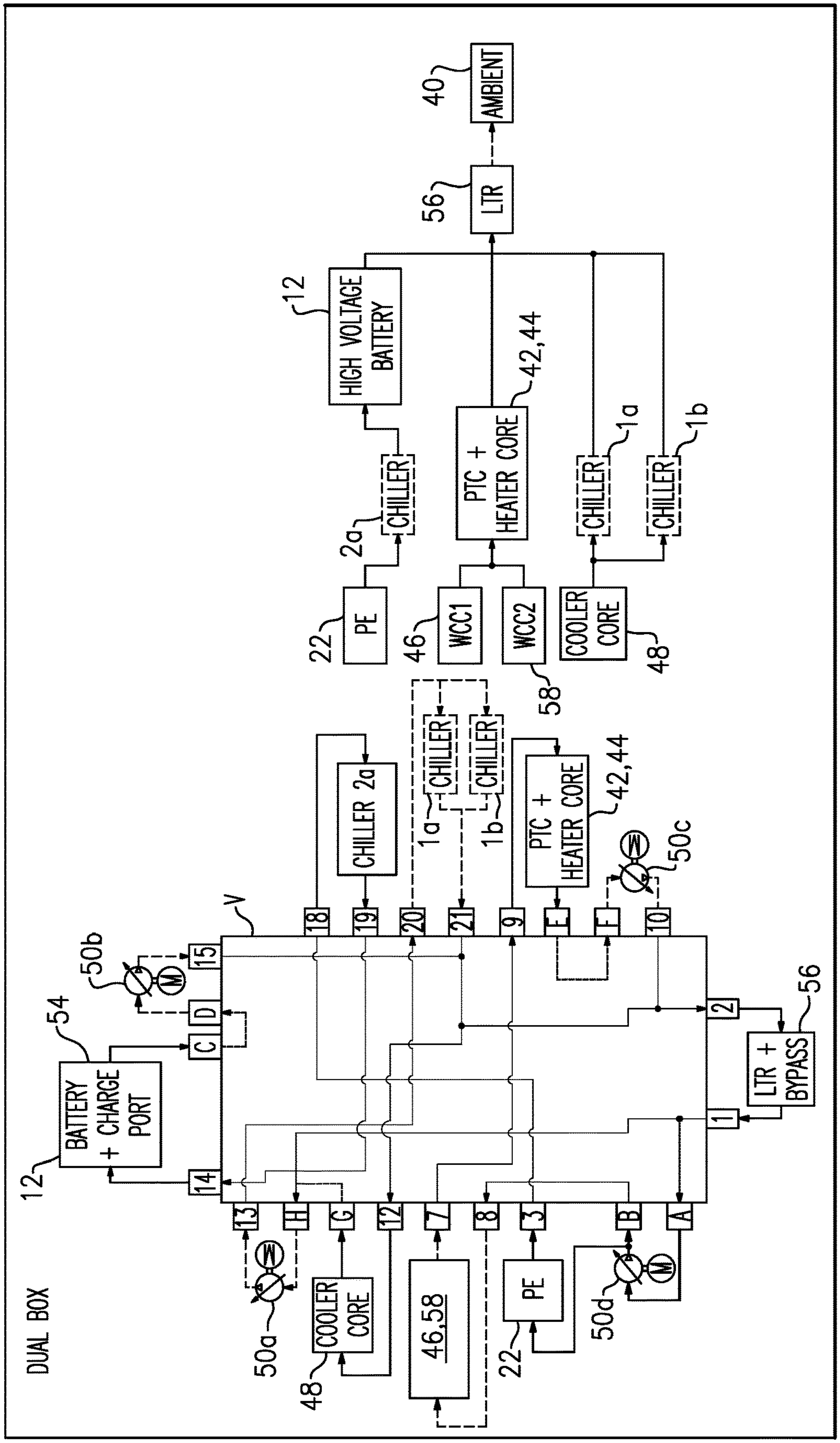
FIG. 6B is an example of the valve state of FIG. 6A for the second configuration.

FIGS. 6A-B show one example of Valve State A. This state comprises a mode that is used for cooling system fill at an assembly plant as well as for the coolant fill service procedure. This mode may also be used as a limp home mode for the vehicle, allowing both the power electronics 22 and battery 12 to be cooled via the low temperature radiator.

As shown in the single box refrigerant system 28 of 6A, the power electronics (PE) 22 has an inlet from pump 50*d* and an outlet to port P3, which connects to port P18 and feeds into chiller 1*b*. Chiller 1*b* has an outlet into port P19, which connects to port P14 and enters into the battery 12 and charge port 54. An outlet of the battery 12 feeds into and through pump 50*b* respectively via ports PC, PD, P15. Port P15 connects to the LTR 56 via port P2. LTR 56 exhaust to ambient 40. The WCC 46 is in a flow only condition (no heat) and an outlet from the WCC 46 enters port P7 and connects to port P9 which feeds into the PTC 44 and heater core 42. The outlet from the heater core 42 enters port E and is sent into and through pump 50*c* via ports PF and P10. Port P10 connects to port P2, which then directs flow to the LTR 56 and out to ambient 40. The core cooler 48 has an outlet to port PG that connects to pump 50*a* via port PH. Output from the pump 50*a* is directed into port P13 which connects to port P20 to enter chiller 1*a* Outlet from chiller 1*a* enters port P21 and connects to LTR 56 via port P2 and LTR 56 exhaust to ambient. Thus, in this mode: the heat from the PE 22 goes to the LTR 56; the LTR 56 takes heat from the PE 22 and the battery 12; the heat from the LTR 56 goes to ambient; the WCC 46 is flow only (no heat); and the chillers 1*a*, 1*b* are both flow only (no heat).

As shown in the dual box refrigerant system 30 of FIG. 6B, the PE 22 has an inlet from pump 50*d* an outlet to port P3, which connects to port P18 and feeds into chiller 2*a*. Chiller 2*a* has an outlet into port P19, which connects to port P14 and enters into the battery 12/charge port 54. An outlet of the battery 12 feeds into and through pump 50*b* respectively via ports PC, PD, P15. Port P15 connects to the LTR 56 via port P2. LTR 56 exhaust to ambient 40. The WCCs 46, 58 are in a flow only condition (no heat) and an outlet from the WCCs 46, 58 enters port P7 and connects to port P9 which feeds into the PTC 44 and heater core 42. The outlet from the heater core 42 enters port E and is sent into and through pump 50 via ports PF and P10. Port P10 connects to port P2, which then directs flow to the LTR 56 and out to ambient 40. The core cooler 48 has an outlet to port PG that connects to pump 50*a* via port PH. Output from the pump 50*a* is directed into port P13 which connects to port P20 to enter chillers 1*a*, 1*b*. Outlet from chillers 1*a*, 1*b* enters port P21 and connects to LTR 56 via port P2 and LTR 56 exhaust to ambient. Thus, in this mode: the heat from the PE 22 goes to the LTR 56; the LTR 56 takes heat from the PE 22 and the battery 12; the heat from the LTR 56 goes to ambient; the WCCs 46, 58 are flow only (no heat); and the chillers 1*a*, 1*b*, 2*a* are all flow only (no heat).

Figure 7A:
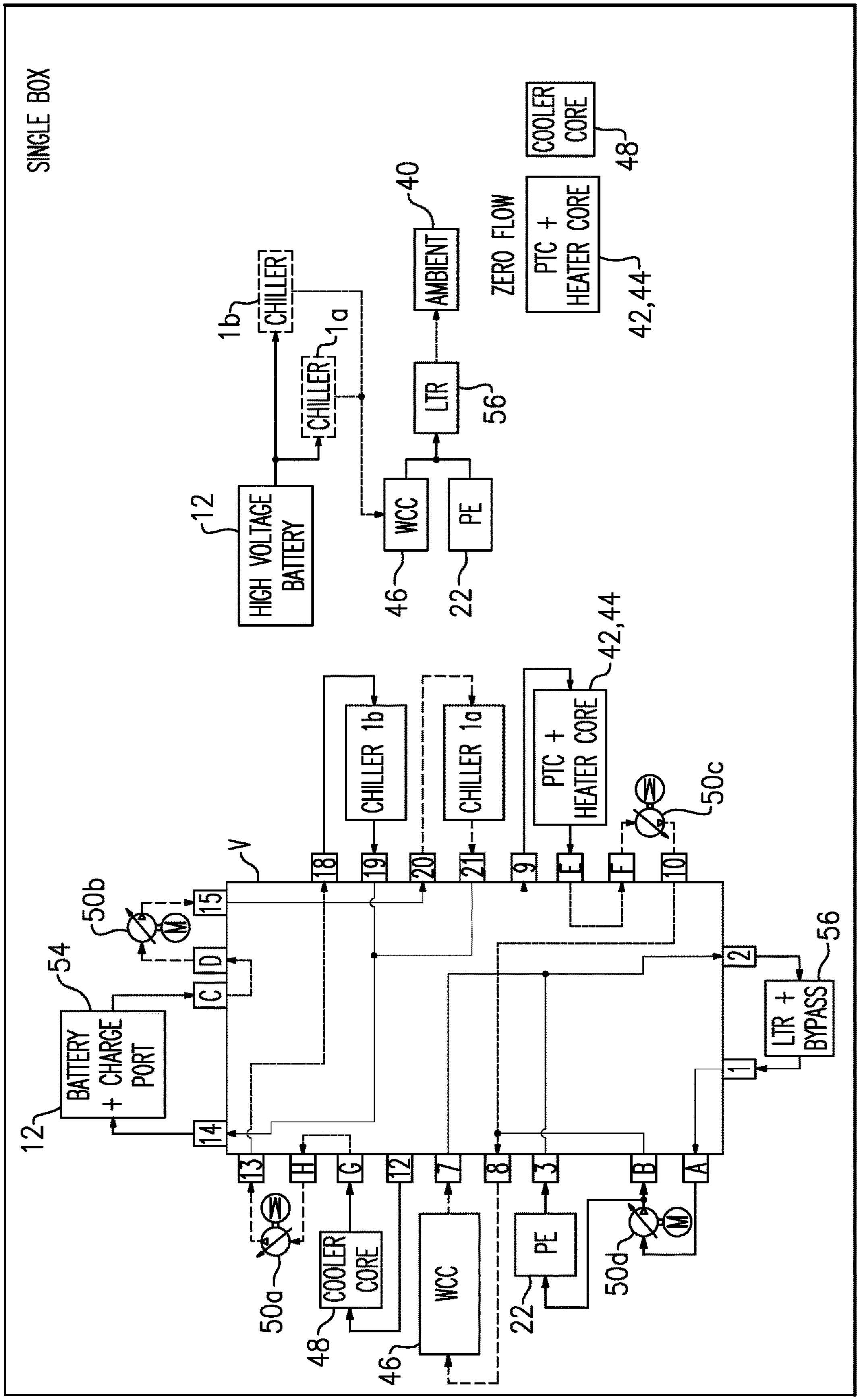
FIG. 7A is an example of another valve state for the first configuration.
Figure 7B:
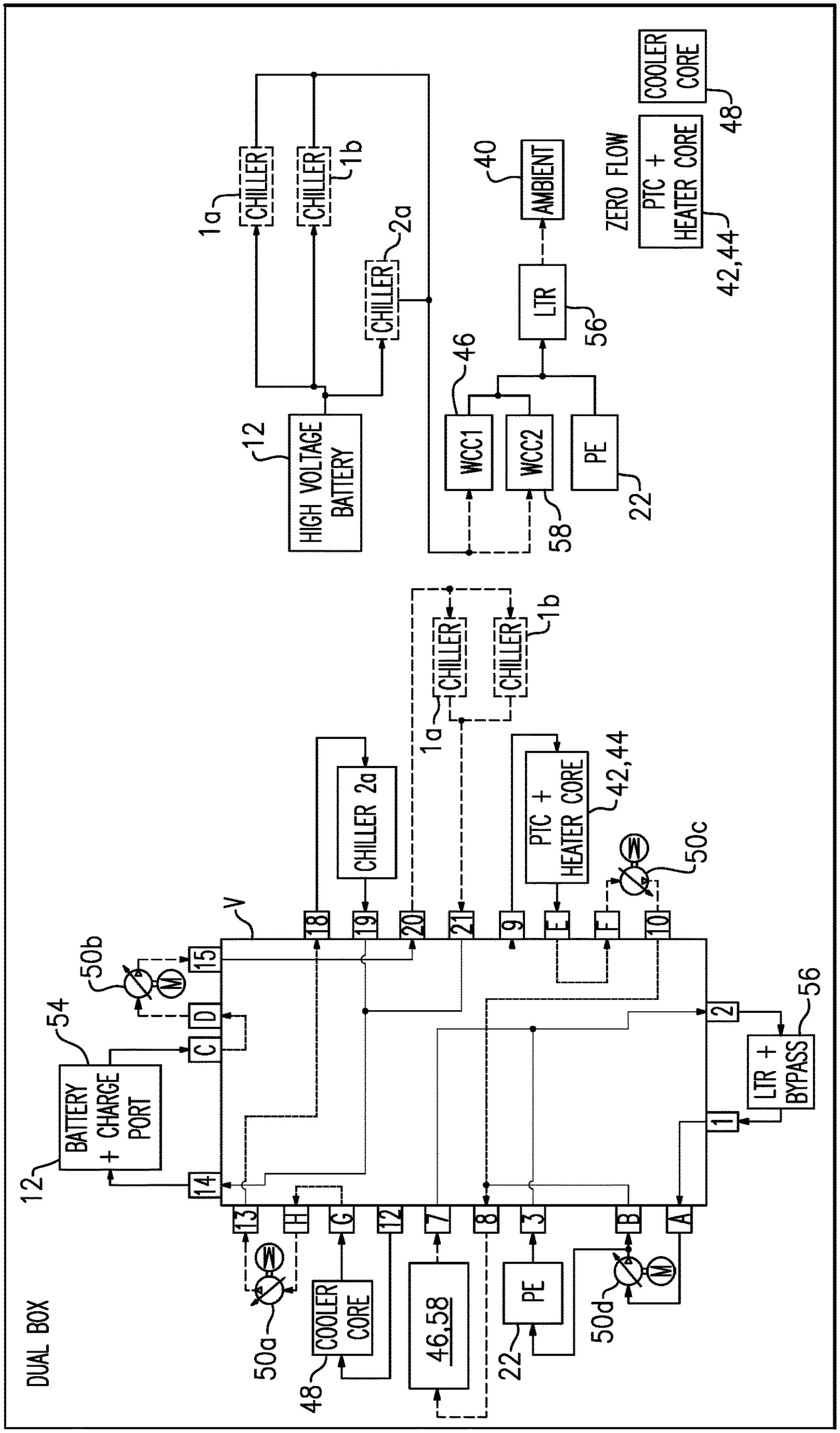
FIG. 7B is an example of the valve state of FIG. 7A for the second configuration.

FIGS. 7A-B show one example of Valve State B. This state comprises a mode that is used for battery DC Fast Charge when the cabin 20 does not have a request for heating or cooling. This mode allows two chillers 1*a*, 1*b* for the single box system 28, and three chillers 1*a*, 1*b*, 2*a* for the dual box system 30, to cool the battery 12 via the refrigerant system. Valve State B applies to an ambient condition where it is considered to be hot, e.g. 30 degrees C.+.

As shown in the single box refrigerant system 28 of 7A, an outlet from the battery 12/charge port 54 feeds into and through pump 50*b* respectively via ports PC, PD, P15. Port P15 connects to port P20 which feeds into chiller 1*a*, and the outlet from chiller 1*a* connects to port P21 which feeds into port P14. Port P14 fees into the battery 12/charge port 54. An outlet from the WCC 46 connects to port P7 which connects to port P2, which feeds into the LTR 56. An outlet from the LTR 56 connects to port P1 which goes into and through pump 50*d* via ports PA and PB. Port PB connects to port P8 which feeds into the WCC 46. PE 22 has an inlet from pump 50*d* and an outlet from the PE 22 connects to port P3 which connects to port P2 which feeds into the LTR 56. There is zero flow through the heater core/PTC 42,44 and zero flow through the cooler core 48. Thus, in this mode (DCFC with no cabin cooling): heat from the PE 22 goes to the LTR 56; the LTR 56 takes heat from the PE 22 and the WCC 46; heat from the LTR 56 goes to ambient 40; heat from the WCC 46 goes to the LTR 56; and the chillers 1*a*, 1*b* take heat from the battery 12.

As shown in the dual box refrigerant system 30 of FIG. 7B, an outlet from the battery 12/charge port 54 feeds into and through pump 50*b* respectively via ports PC, PD, P15. Port P15 connects to port P20 which feeds into chillers 1*a*, 1*b* and the outlet from chillers 1*a*, 1*b* connects to port P21 which feeds into port P14. Port P14 fees into the battery 12/charge port 54. An outlet from the WCCs 46, 58 connects to port P7 which connects to port P2, which feeds into the LTR 56. An outlet from the LTR 56 connects to port P1 which goes into and through pump 50*d* via ports PA and PB. Port PB connects to port P8 which feeds into the WCCs 46, 58. PE 22 has an inlet from pump 50*d* and an outlet from the PE 22 connects to port P3 which connects to port P2 which feeds into the LTR 56. There is zero flow through the heater core/PTC 42,44 and zero flow through the cooler core 48. Thus, in this mode (DCFC with no cabin cooling): heat from the PE 22 goes to the LTR 56; the LTR 56 takes heat from the PE 22 and the WCCs 46, 58; heat from the LTR 56 goes to ambient 40; heat from the WCCs 46, 58 goes to the LTR 56; and the chillers 1*a*, 1*b*, 2*a* take heat from the battery 12.

Figure 8A:
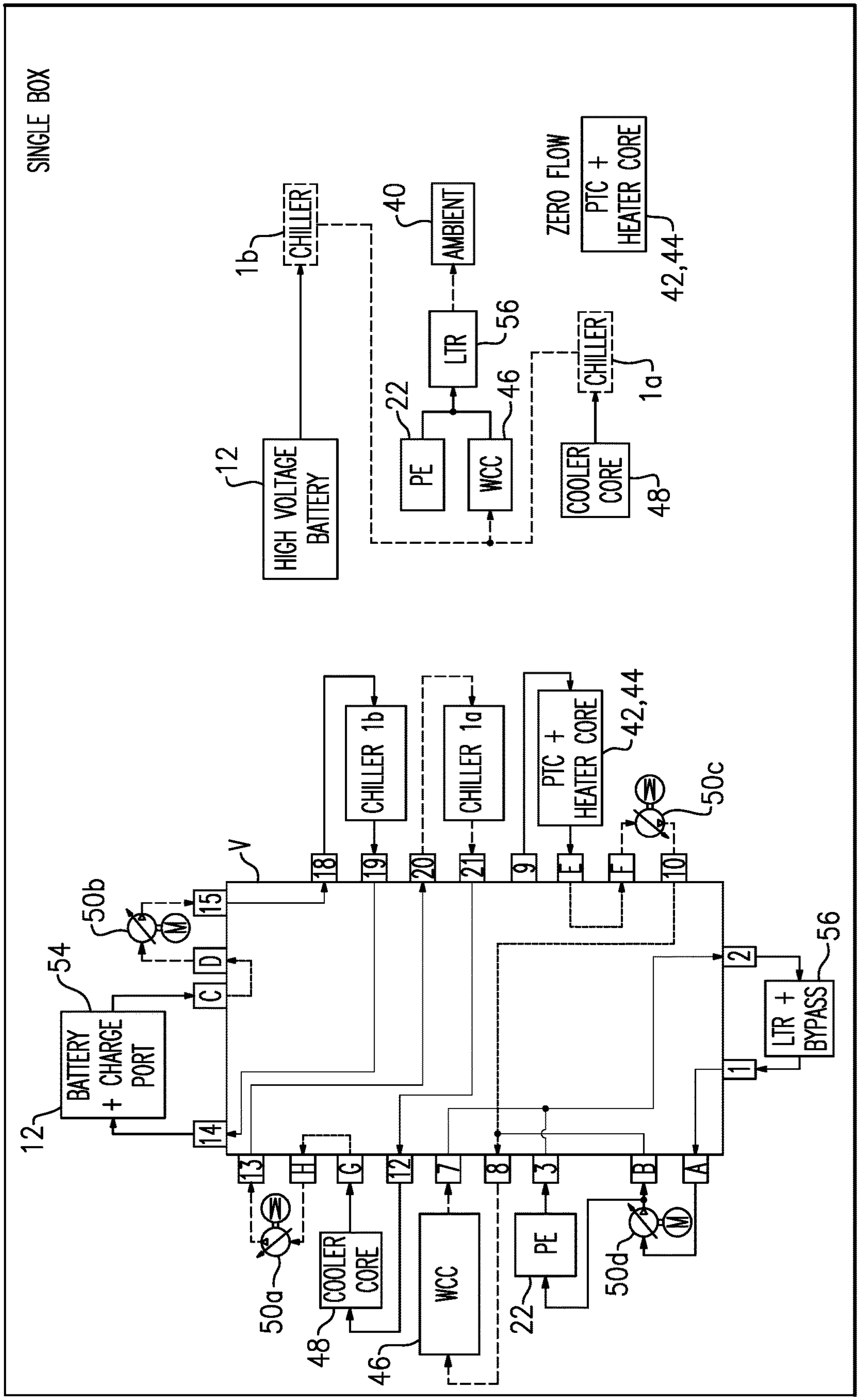
FIG. 8A is an example of another valve state for the first configuration.
Figure 8B:
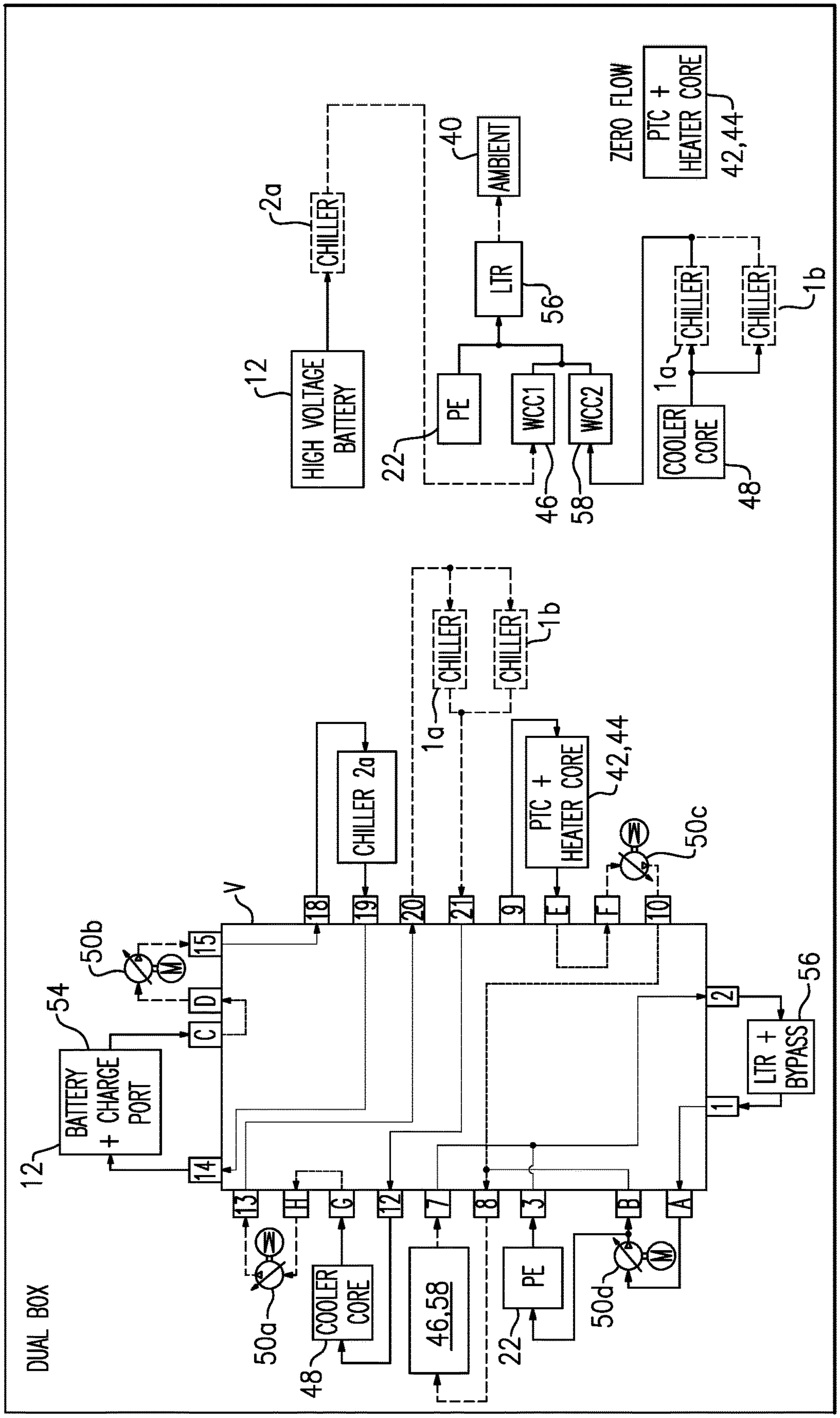
FIG. 8B is an example of the valve state of FIG. 8A for the second configuration.

FIGS. 8A-B show one example of Valve State C. This state comprises a mode for cabin and battery cooling. For the dual box system 30, this mode allows the use of two chillers to cool the cabin 20, and one chiller to cool the battery 12. Valve State C applies to an ambient condition where it is considered hot, e.g. 30 degrees C.+.

As shown in the single box refrigerant system 28 of 8A, an outlet from the battery 12/charge port 54 feeds into and through pump 50*b* respectively via ports PC, PD, P15. Port P15 connects to port P18 which feeds into chiller 1*b*, which connects to port P19, which fees back into the battery inlet port P14. The outlet of the PE 22 connects to port P3 which feeds into the LTR 56 via port P2. The outlet from the LTR 56 connects to port P1 which feeds into and through pump 50*d* via ports PA and PB. Port PB connects to port P8 which feeds into the WCC 46. The outlet from the WCC 46 connects to port P7 which feeds into the LTR 56 via port P2. The outlet from the cooler core 48 connects to port PG which feeds into and through pump 50*a* via ports PH and P13. Port P13 feeds into port P20 as in inlet to chiller 1*a*. The outlet from chiller 1*a* connects to port P21 which connects to port P12 which feeds back into the cooler core 48. An inlet to PE 22 is associated with pump 50*d*. There is no flow through the heater core 42/PTC 44. Thus, in this mode (cabin and battery cooling): heat from the PE 22 goes to the LTR 56; the LTR 56 takes heat from the PE 22 and the WCC 46; heat from the LTR 56 goes to ambient 40; heat from the WCC 46 goes to the LTR 56; chiller 1*a* takes heat from the cooler core 48; and chiller 1*b* takes heat from the battery 12.

As shown in the dual box refrigerant system 30 of FIG. 8B, an outlet from the battery 12/charge port 54 feeds into and through pump 50*b* respectively via ports PC, PD, P15. Port P15 connects to port P18 which feeds into chiller 2*a*, which connects to port P19, which fees back into the battery inlet port P14. The outlet of the PE 22 connects to port P3 which feeds into the LTR 56 via port P2. The outlet from the LTR 56 connects to port P1 which feeds into and through pump 50*d* via ports PA and PB. Port PB connects to port P8 which feeds into the WCCs 46, 58. The outlet from the WCCs 46, 58 connects to port P7 which feeds into the LTR 56 via port P2. The outlet from the cooler core 48 connects to port PG which feeds into and through pump 50*a* via ports PH and P13. Port P13 feeds into port P20 as in inlet to chillers 1*a*, 1*b*. The outlet from chillers 1*a*, 1*b* connects to port P21 which connects to port P12 which feeds back into the cooler core 48. An inlet to PE 22 is associated with pump 50*d*. There is no flow through the heater core 42/PTC 44. Thus, in this mode (cabin and battery cooling): heat from the PE 22 goes to the LTR 56; the LTR 56 takes heat from the PE 22 and the WCC 46; heat from the LTR 56 goes to ambient 40; heat from the WCCs 46, 58 goes to the LTR 56; chiller 2*a* takes heat from the cooler core 48; and chillers 1*a*, 1*b* takes heat from the battery 12.

Figure 9A:
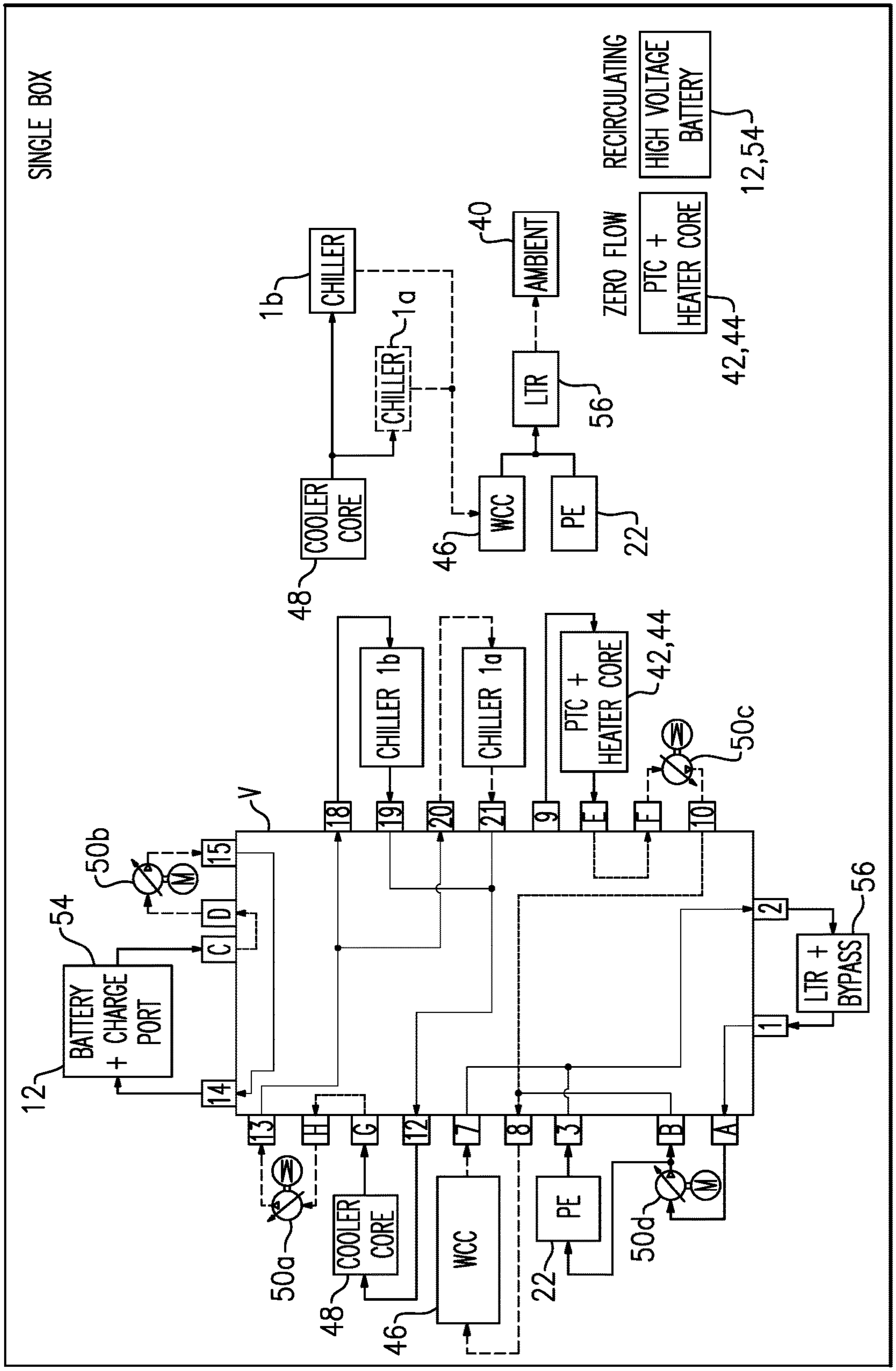
FIG. 9A is an example of another valve state for the first configuration.
Figure 9B:
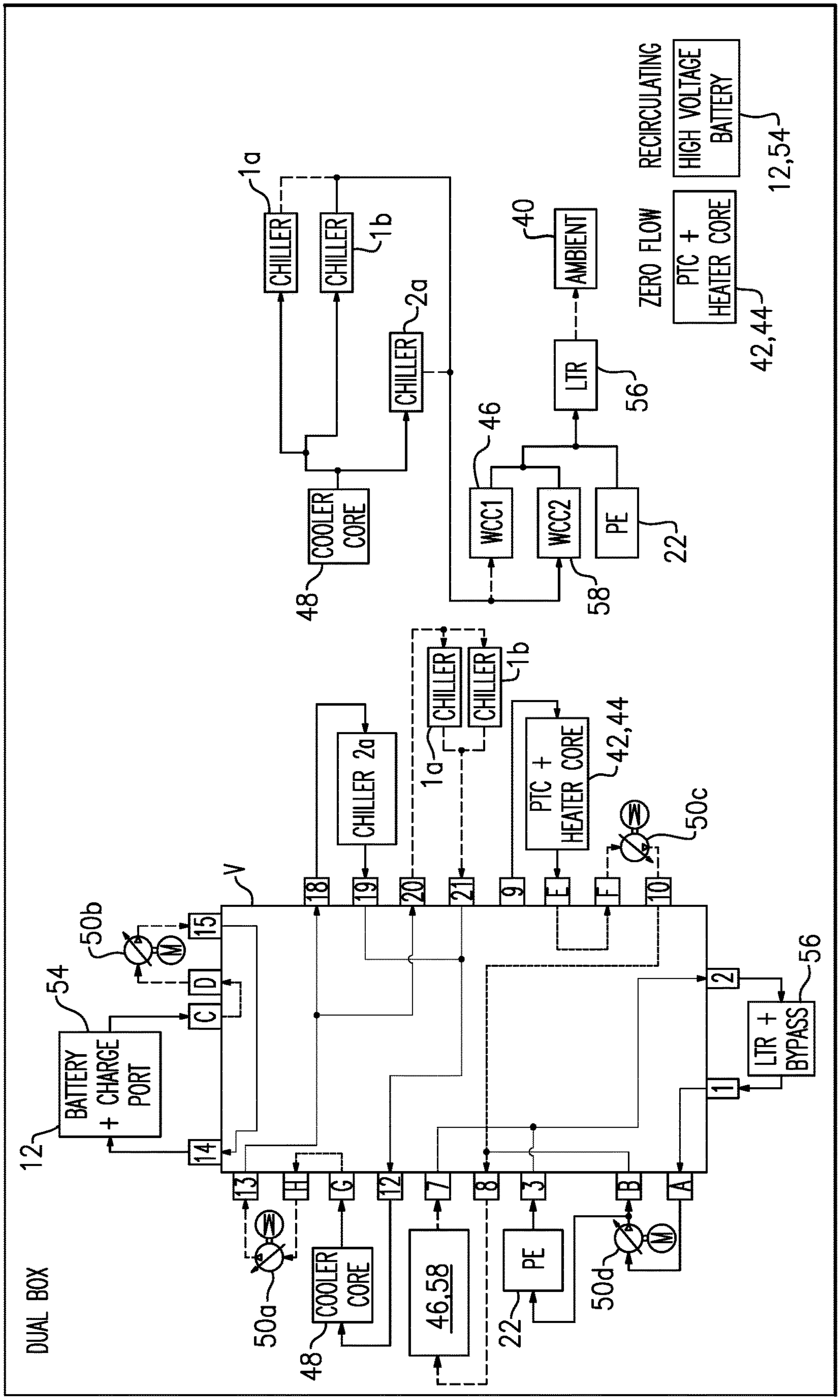
FIG. 9B is an example of the valve state of FIG. 9A for the second configuration.

FIGS. 9A-B show one example of Valve State N. This state comprises a mode that uses all chillers to cool the cabin 20. For a single box system 28, two chillers are used to cool the cabin 20. For the dual box system 30, three chillers are used to cool the cabin 20. Valve State N applies to an ambient condition where it is considered hot, e.g. 30 degrees C.+.

As shown in the single box refrigerant system 28 of 9A, the outlet from the cooler core 48 connects to port PG which feeds into and through pump 50*a* via ports PH and P13. Port P13 feeds into ports P18 and P20 which feeds into coolers 1*a* and 1*b*. The outlets from coolers 1*a* and 1*b* respectively feed into ports P21 and P19 which combine and connect to port P12 as an inlet into the cooler core 48. An inlet to PE 22 is associated with pump 50*d*. The outlet of the PE 22 connects to port P3 which feeds into the LTR 56 via port P2. The outlet from the LTR 56 connects to port P1 which feeds into and through pump 50*d* via ports PA and PB. Port PB connects to port P8 which feeds into the WCC 46. The outlet from the WCC 46 connects to port P7 which feeds into the LTR 56 via port P2. The outlet from the battery 12/charge port 54 feeds into and through pump 50*b* respectively via ports PC, PD, P15. Port P15 connects to port P14 which feeds back into the battery 12/charge port 54. There is no flow through the heater core 42/PTC 44. There is recirculating flow via the battery 12/charge port 54. Thus, in this mode (AC pull down, recirculate battery): heat from the PE 22 goes to the LTR 56; the LTR 56 takes heat from the PE 22 and the WCC 46; heat from the LTR 56 goes to ambient; heat from the WCC 46 goes to the LTR 56; chiller 1*a* takes heat from the cooler core 48; and chiller 1*b* takes heat from the cooler core 48.

As shown in the dual box refrigerant system 30 of FIG. 9B, the outlet from the cooler core 48 connects to port PG which feeds into and through pump 50*a* via ports PH and P13. Port P13 feeds into ports P18 which feeds into chiller 2*a*. Port 13 also connects to port P20 which feeds into coolers 1*a* and 1*b*. The outlet from chiller 2*a* feeds into port P19 which connects to port P12 as an inlet into the cooler core 48. The outlets from coolers 1*a* and 1*b* feed into port P21 which combines with the feed from chiller 2*a* and connect to port P12 as an inlet into the cooler core 48. An inlet to PE 22 is associated with pump 50*d*. The outlet of the PE 22 connects to port P3 which feeds into the LTR 56 via port P2. The outlet from the LTR 56 connects to port P1 which feeds into and through pump 50*d* via ports PA and PB. Port PB connects to port P8 which feeds into the WCC 46. The outlet from the WCC 46 connects to port P7 which connects to the LTR 56 via port P2. The outlet from the battery 12/charge port 54 feeds into and through pump 50*b* respectively via ports PC, PD, P15. Port P15 connects to port P14 which feeds back into the battery 12/charge port 54. There is no flow through the heater core 42/PTC 44. There is recirculating flow via the battery 12/charge port 54. Thus, in this mode (AC pull down, recirculate battery): heat from the PE 22 goes to the LTR 56; the LTR 56 takes heat from the PE 22 and the WCC 46; heat from the LTR 56 goes to ambient; heat from the WCCs 46, 58 goes to the LTR 56; and chillers 1*a*, 1*b*, 2*a* take heat from the cooler core 48.

Figure 10A:
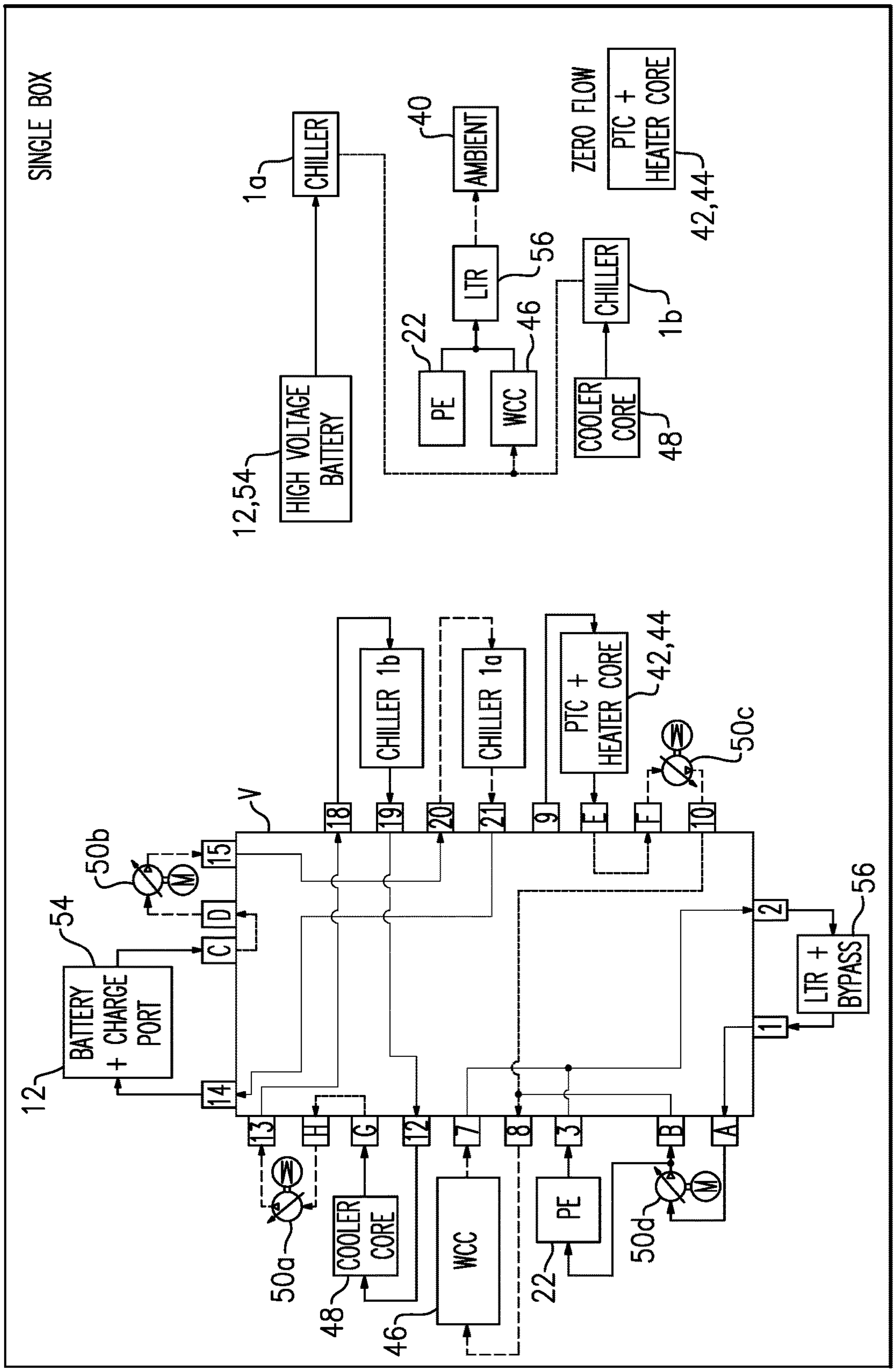
FIG. 10A is an example of another valve state for the first configuration.
Figure 10B:
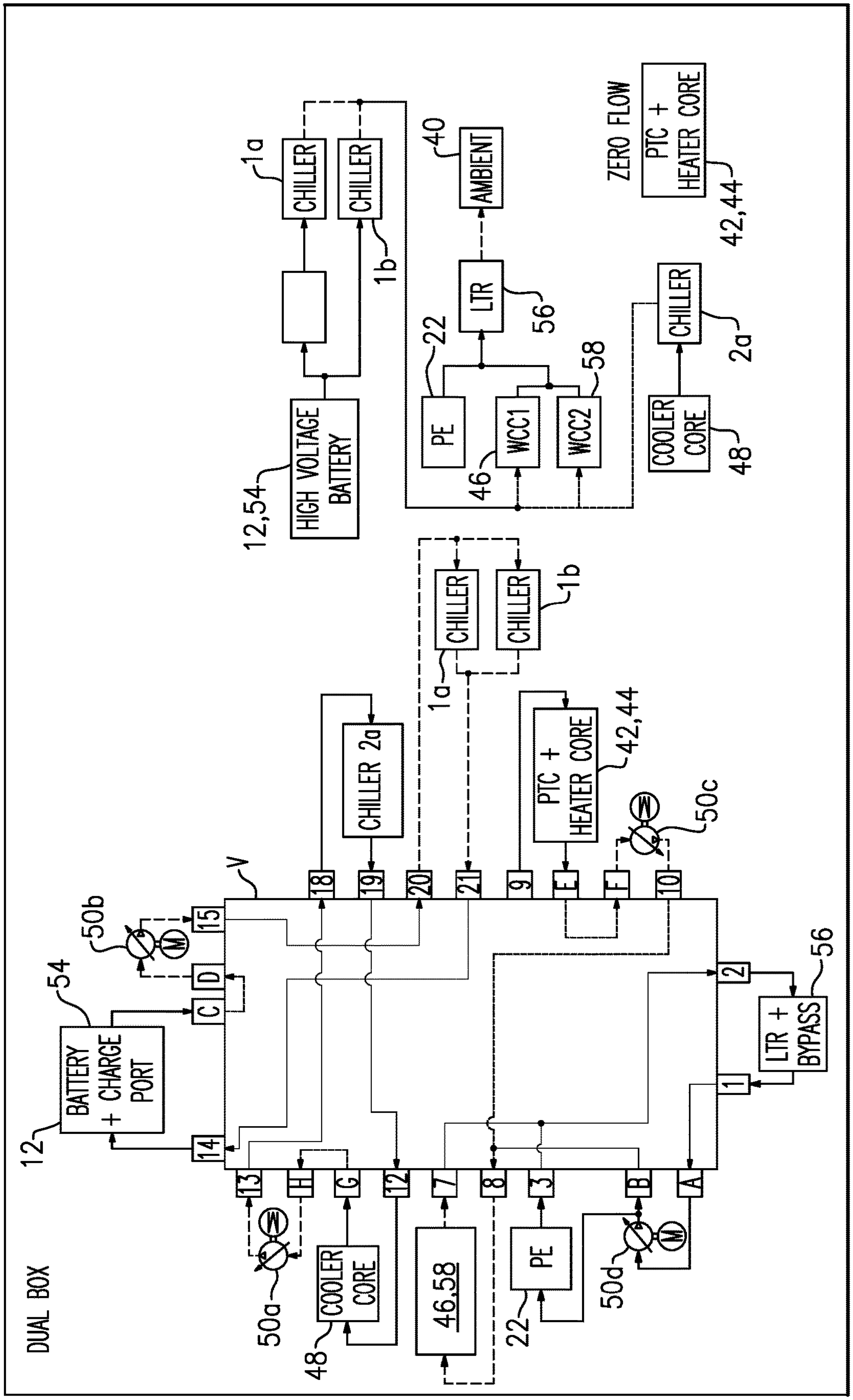
FIG. 10B is an example of the valve state of FIG. 10A for the second configuration.

FIGS. 10A-B show one example of Valve State Q. This state comprises an operational mode that is identical to Mode C for the single box system 28. For the dual box system 30, this mode allows the use of two chillers for battery cooling, and one chiller to cool the cabin 20. Valve State Q applies to an ambient condition where it is considered hot, e.g. 30 degrees C.+.

As shown in the single box refrigerant system 28 of 10A, an outlet from the battery 12/charge port 54 feeds into and through pump 50*b* respectively via ports PC, PD, P15. Port P15 connects to port P20 which feeds into chiller 1*a*, which connects to port P21, which fees back into the battery inlet port P14. An inlet to PE 22 is associated with pump 50*d*. The outlet of the PE 22 connects to port P3 which feeds into the LTR 56 via port P2. The outlet from the LTR 56 connects to port P1 which feeds into and through pump 50*d* via ports PA and PB. Port PB connects to port P8 which feeds into the WCC 46. The outlet from the WCC 46 connects to port P7 which feeds into the LTR 56 via port P2. The outlet from the cooler core 48 connects to port PG which feeds into and through pump 50*a* via ports PH and P13. Port P13 feeds into port P18 as in inlet to chiller 1*b*. The outlet from chiller 1*b* connects to port P19 which connects to port P12 which feeds back into the cooler core 48. There is no flow through the heater core 42/PTC 44. Thus, in this mode (cabin and battery cooling): heat from the PE 22 goes to the LTR 56; the LTR 56 takes heat from the PE 22 and the WCC 46; heat from the LTR 56 goes to ambient 40; heat from the WCC 46 goes to the LTR 56; chiller 1*a* takes heat from the battery 12; and chiller 1*b* takes heat from the cooler core 48.

As shown in the dual box refrigerant system 30 of FIG. 10B, an outlet from the battery 12/charge port 54 feeds into and through pump 50*b* respectively via ports PC, PD, P15. Port P15 connects to port P20 which feeds into chillers 1*a* and 1*b*, and an outlet from the chillers 1*a* and 1*b* connects to port P21, which fees back into the battery inlet port P14. An inlet to PE 22 is associated with pump 50*d*. The outlet of the PE 22 connects to port P3 which feeds into the LTR 56 via port P2. The outlet from the LTR 56 connects to port P1 which feeds into and through pump 50*d* via ports PA and PB. Port PB connects to port P8 which feeds into the WCCs 46, 58. The outlet from the WCCs 46, 58 connects to port P7 which feeds into the LTR 56 via port P2. The outlet from the cooler core 48 connects to port PG which feeds into and through pump 50*a* via ports PH and P13. Port P13 feeds into port P18 as in inlet to chiller 2*a*. The outlet from chiller 2*a* connects to port P19 which connects to port P12 which feeds back into the cooler core 48. There is no flow through the heater core 42/PTC 44. Thus, in this mode (cabin and battery cooling): heat from the PE 22 goes to the LTR 56; the LTR 56 takes heat from the PE 22 and the WCC 46; heat from the LTR 56 goes to ambient 40; heat from the WCCs 46, 58 goes to the LTR 56; chillers 1*a*, 1*b* take heat from the battery 12; and chiller 2*a* takes heat from the cooler core 48.

Figure 11A:
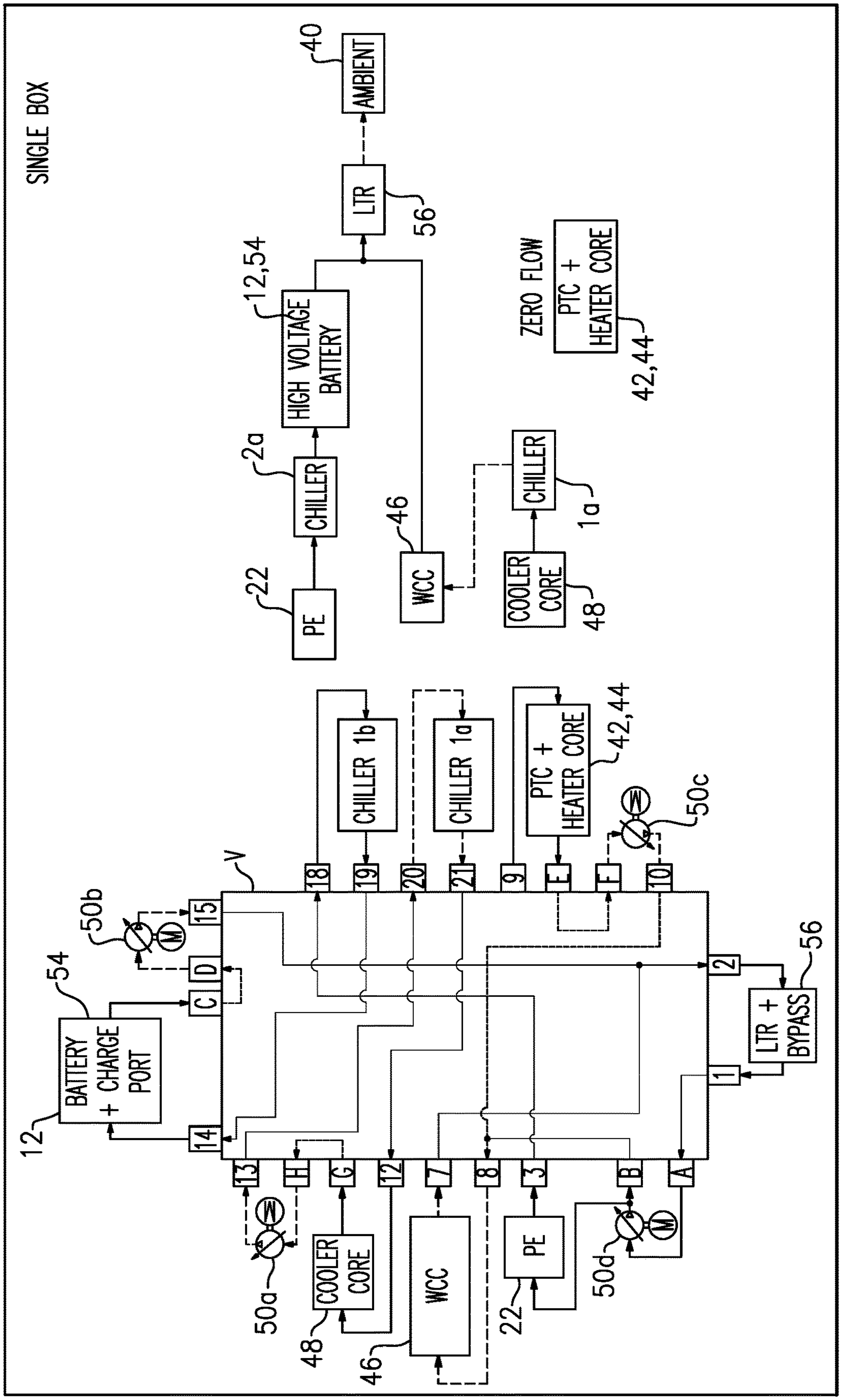
FIG. 11A is an example of another valve state for the first configuration.
Figure 11B:
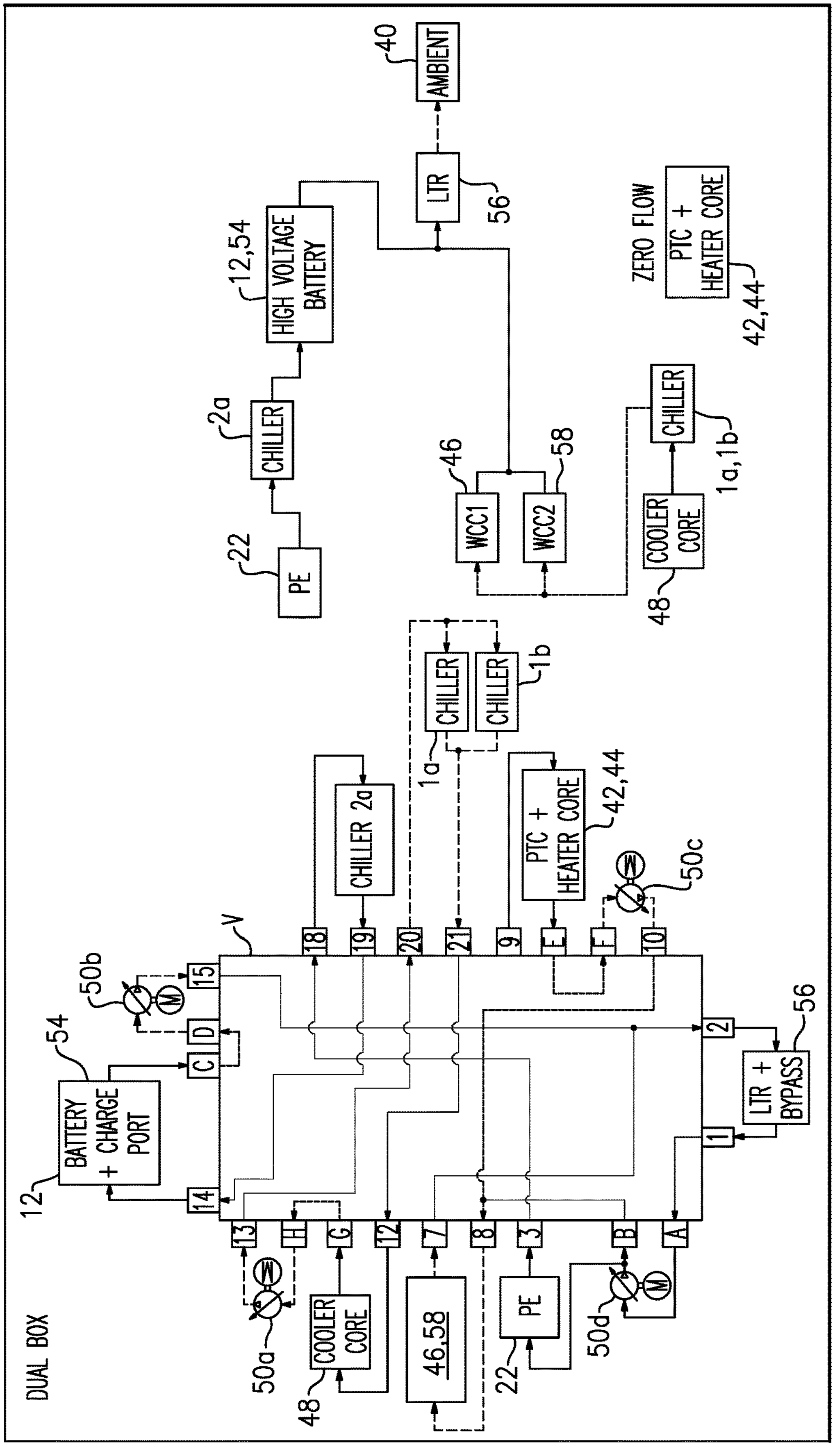
FIG. 11B is an example of the valve state of FIG. 11A for the second configuration.

FIGS. 11A-B show one example of Valve State D for active cabin cooling and passive battery cooling. This state comprises a mode that uses the LTR 56 to cool the battery 12 and power electronics 22. One chiller may be used to cool the power electronics 22 and battery 12 as well. The cabin 20 may be cooled with a single chiller on the single box system 28, or two chillers on the dual box system 30. Valve State D applies to an ambient condition where it is considered mild, e.g. 15-30 degrees C.

As shown in the single box refrigerant system 28 of 11A, an inlet to PE 22 is associated with pump 50*d* and the outlet of the PE 22 feeds into port P3 which connects to port P18, which feeds into chiller 1*b*. The output from chiller 1*b* feeds into port P19 which connects to the inlet port P14 to the battery 12/charge port 54. The outlet from the battery 12/charge port 54 feeds into and through pump 50*b* respectively via ports PC, PD, P15. Port P15 connects to port P2 which feeds into the LTR 56. The outlet port P1 from the LTR 56 connects to port P1 which feeds into and through pump 50*d* via ports PA and PB. Port PB connects to port P8 which feeds into WCC 46. The outlet from WCC 46 feeds into port P7 which connects to port P2 to feed into the LTR 56. The outlet from the cooler core 48 feeds into port PG which feeds into and through pump 50*a* via ports PH and P13. Port P13 connects to port P20 which feeds into chiller 1*a*. The outlet from chiller 1*a* feeds into port P21 which connects to port P12 which feeds into the cooler core 48. There is no flow through the heater core 42/PTC 44. Thus, in this mode (cabin active cooling and battery passive cooling): heat from the PE goes to the LTR 56; the LTR 56 takes heat from the PE 22, battery 12, and WCC 46; heat from the LTR 56 goes to ambient; heat from the WCC 46 goes to the LTR 56; chiller 1*a* takes heat from the cooler core 48; and chiller 1*b* is flow only or takes heat from the battery 12.

As shown in the dual box refrigerant system 30 of FIG. 11B, an inlet to PE 22 is associated with pump 50*d* and the outlet of the PE 22 feeds into port P3 which connects to port P18, which feeds into chiller 2*a*. The output from chiller 2*a* feeds into port P19 which connects to the inlet port P14 to the battery 12/charge port 54. The outlet from the battery 12/charge port 54 feeds into and through pump 50*b* respectively via ports PC, PD, P15. Port P15 connects to port P2 which feeds into the LTR 56. The LTR 56 connects to port P1 which feeds into and through pump 50*d* via ports PA and PB. Port PB connects to port P8 which feeds into WCCs 46, 58. The outlet from WCCs 46, 58 feeds into port P7 which connects to port P2 to feed into the LTR 56. The outlet from the cooler core 48 feeds into port PG which feeds into and through pump 50*a* via ports PH and P13. Port P13 connects to port P20 which feeds into chillers 1*a*, 1*b*. The outlet from chillers 1*a*, 1*b* feeds into port P21 which connects to port P12 which feeds into the cooler core 48. There is no flow through the heater core 42/PTC 44. Thus, in this mode (cabin active cooling and battery passive cooling): heat from the PE goes to the LTR 56; the LTR 56 takes heat from the PE 22, battery 12, and WCC 46; heat from the LTR 56 goes to ambient; heat from the WCCs 46, 58 goes to the LTR 56; chillers 1*a*, 1*b* take heat from the cooler core 48; and chiller 2*a* is flow only or takes heat from the battery 12.

Figure 12A:
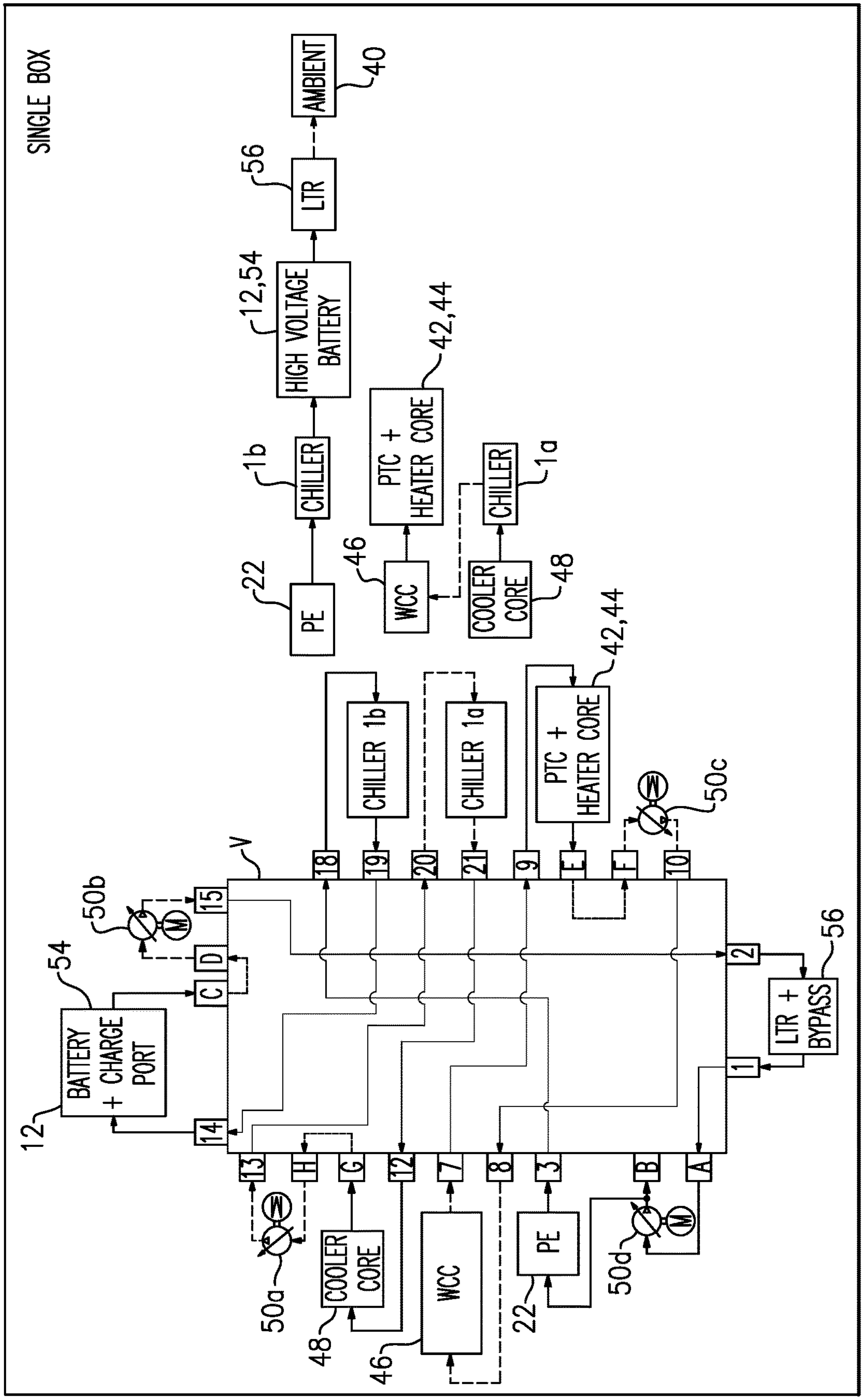
FIG. 12A is an example of another valve state for the first configuration.
Figure 12B:
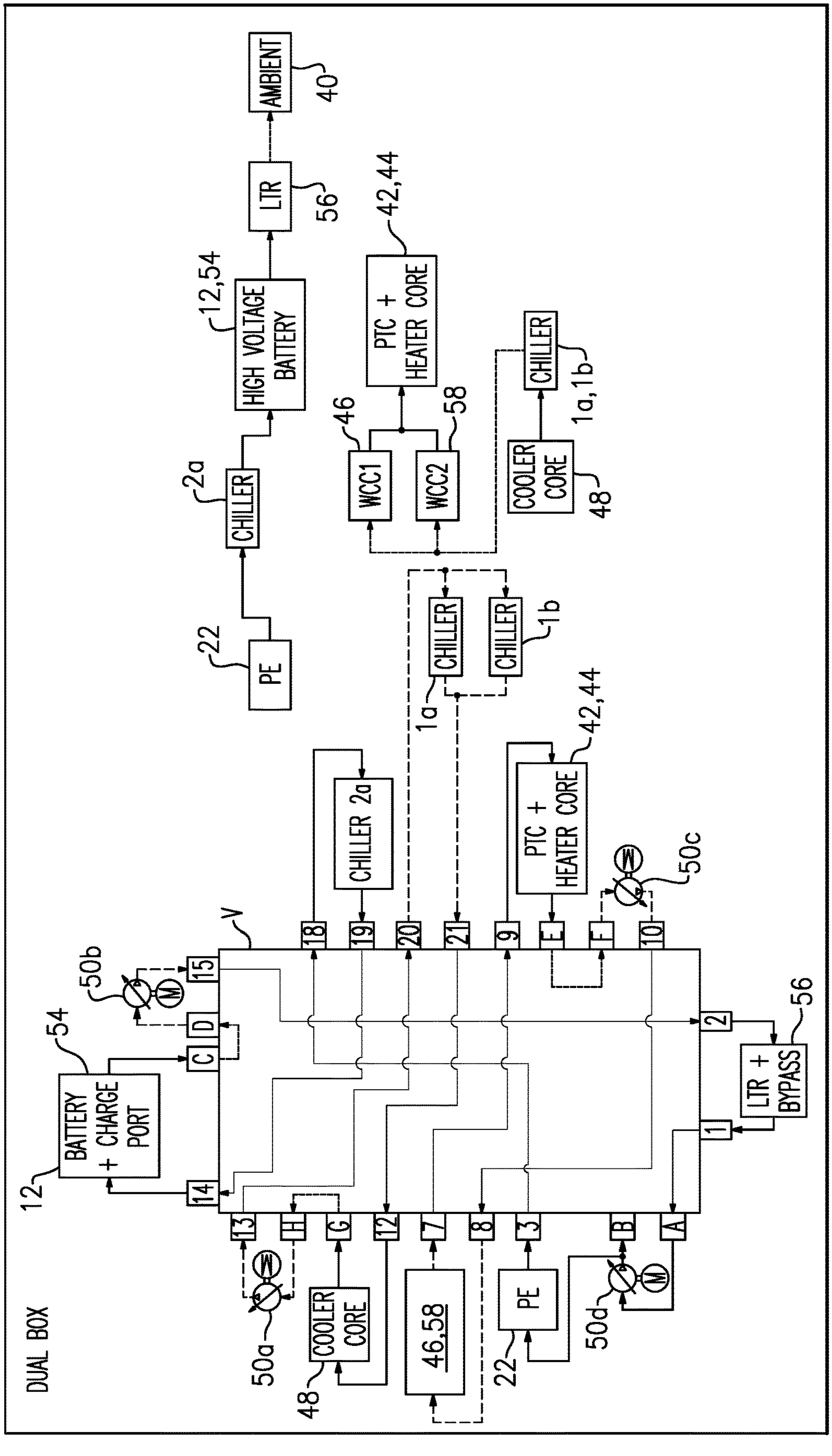
FIG. 12B is an example of the valve state of FIG. 12A for the second configuration.

FIGS. 12A-B show one example of Valve State E. This state comprises multiple modes. In one or more modes, the LTR 56 is used to cool the battery 12 and power electronics 22. In one mode, a chiller may be used to cool the power electronics 22 and battery 12 as well. The heat from the power electronics 22, battery 12, and LTR 56 may then be transferred from the chiller to the WCC through the refrigerant system to warm the cabin 20. The cabin 20 may be dehumidified by being cooled with a single chiller on the single box system 28, or two chillers on the dual box system 30. To compensate for the cabin cooling, the cabin heater core 42 may be used simultaneously via heat from the WCC. Valve State E applies to two different sets of ambient conditions: (1) it is considered mild/humid, e.g. 0-20 degrees C.; or (2) cold, e.g. less than 20 degrees C.

As shown in the single box refrigerant system 28 of 12A, an inlet to PE 22 is associated with pump 50*d* and the outlet of the PE 22 feeds into port P3 which connects to port P18, which feeds into chiller 1*b*. The output from chiller 1*b* feeds into port P19 which connects to the inlet port P14 to the battery 12/charge port 54. The outlet from the battery 12/charge port 54 feeds into and through pump 50*b* respectively via ports PC, PD, P15. Port P15 connects to port P2 which feeds into the LTR 56. The LTR 56 connects to port P1 which feeds into and through pump 50*d* via port PA. The pump 50*d* then feeds into an inlet to the PE 22. The outlet from WCC 46 feeds into port P7 which connects to port P9 to feed into the heater core 42/PTC 44. The outlet of the heater core 42/PTC 44 feeds into port PE which feeds into and through pump 50*c* via ports PF and P10. Port P10 connects to port P8 which feeds into the WCC 46. The outlet from the cooler core 48 feeds into port PG which feeds into and through pump 50*a* via ports PH and P13. Port P13 connects to port P20 which feeds into chiller 1*a*. The outlet from chiller 1*a* feeds into port P21 which connects to port P12 which feeds into the cooler core 48.

In this Valve State E, in one example, there are three different possible configurations for the single box configuration. In a first configuration there is dehumidification and battery cooling, and so in this mode: heat from the PE goes to the LTR 56; the LTR 56 takes heat from the PE 22 and the battery 12; heat from the LTR 56 goes to ambient; heat from the WCC 46 goes to the heater core 42; chiller 1*a* takes heat from the cooler core 48; and chiller 1*b* is flow only or takes heat from the battery 12.

In a second configuration there is dehumidification and battery heating with PE waste heat, and so in this mode: heat from the PE goes to the battery 12; the LTR 56 is "off" (LTR bypass); heat from the WCC 46 goes to the heater core 42; chiller 1*a* takes heat from the cooler core 48; and chiller 1*b* is flow only (no heat).

In a third configuration there is cabin heating with battery cooling/energy recovery, and so in this mode: heat from the PE goes to the battery 12 and chiller; the LTR 56 is "off" (LTR bypass); heat from the WCC 46 goes to the heater core 42; chiller 1*a* is flow only (no heat); and chiller 1*b* takes heat from the battery 12.

As shown in the dual box refrigerant system 30 of FIG. 12B, an inlet to PE 22 is associated with pump 50*d* and the outlet of the PE 22 feeds into port P3 which connects to port P18, which feeds into chiller 2*a*. The output from chiller 2*a* feeds into port P19 which connects to the inlet port P14 to the battery 12/charge port 54. The outlet from the battery 12/charge port 54 feeds into and through pump 50*b* respectively via ports PC, PD, P15. Port P15 connects to port P2 which feeds into the LTR 56. The LTR 56 connects to port P1 which feeds into and through pump 50*d* via port PA. The pump 50*d* then feeds into an inlet to the PE 22. The outlet from WCCs 46, 58 feeds into port P7 which connects to port P9 to feed into the heater core 42/PTC 44. The outlet of the heater core 42/PTC 44 feeds into port PE which feeds into and through pump 50*c* via ports PF and P10. Port P10 connects to port P8 which feeds into the WCCs 46, 58. The outlet from the cooler core 48 feeds into port PG which feeds into and through pump 50*a* via ports PH and P13. Port P13 connects to port P20 which feeds into chillers 1*a*, 1*b*. The outlet from chillers 1*a*, 1*b* feeds into port P21 which connects to port P12 which feeds into the cooler core 48.

In this Valve State E, in one example there are three different possible configurations for the dual box configuration. In a first configuration there is dehumidification and battery cooling, and so in this mode: heat from the PE goes to the LTR 56; the LTR 56 takes heat from the PE 22 and the battery 12; heat from the LTR 56 goes to ambient; heat from the WCCs 46, 58 goes to the heater core 42; chiller 1*a* takes heat from the cooler core 48; chiller 1*b* takes heat from the cooler core 48; and chiller 2*a* is flow only or takes heat from the battery 12. In a second configuration there is dehumidification and battery heating with PE waste heat, and so in this mode: heat from the PE goes to the battery 12; the LTR 56 is "off" (LTR bypass); heat from the WCCs 46, 58 goes to the heater core 42; chillers 1*a*, 1*b* take heat from the cooler core 48; and chiller 2*a* is flow (no heat).

In a third configuration there is cabin heating with battery cooling/energy recovery, and so in this mode: heat from the PE goes to the battery 12 and chiller; the LTR 56 is "off" (LTR bypass); heat from the WCCs 46, 58 goes to the heater core 42; chillers 1*a*, 1*b* are flow only (no heat); and chiller 2*a* takes heat from the battery 12.

Figure 13A:
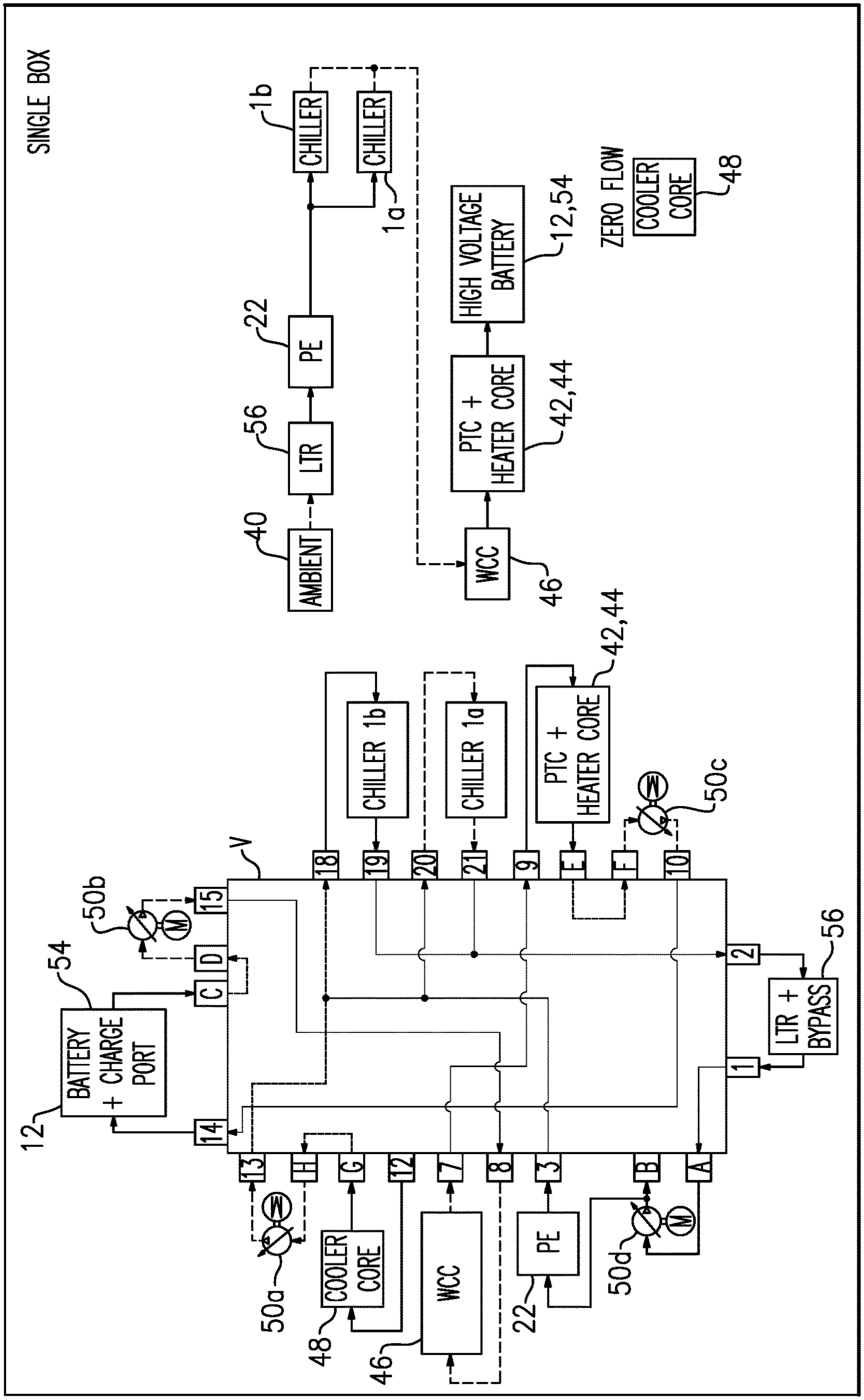
FIG. 13A is an example of another valve state for the first configuration.
Figure 13B:
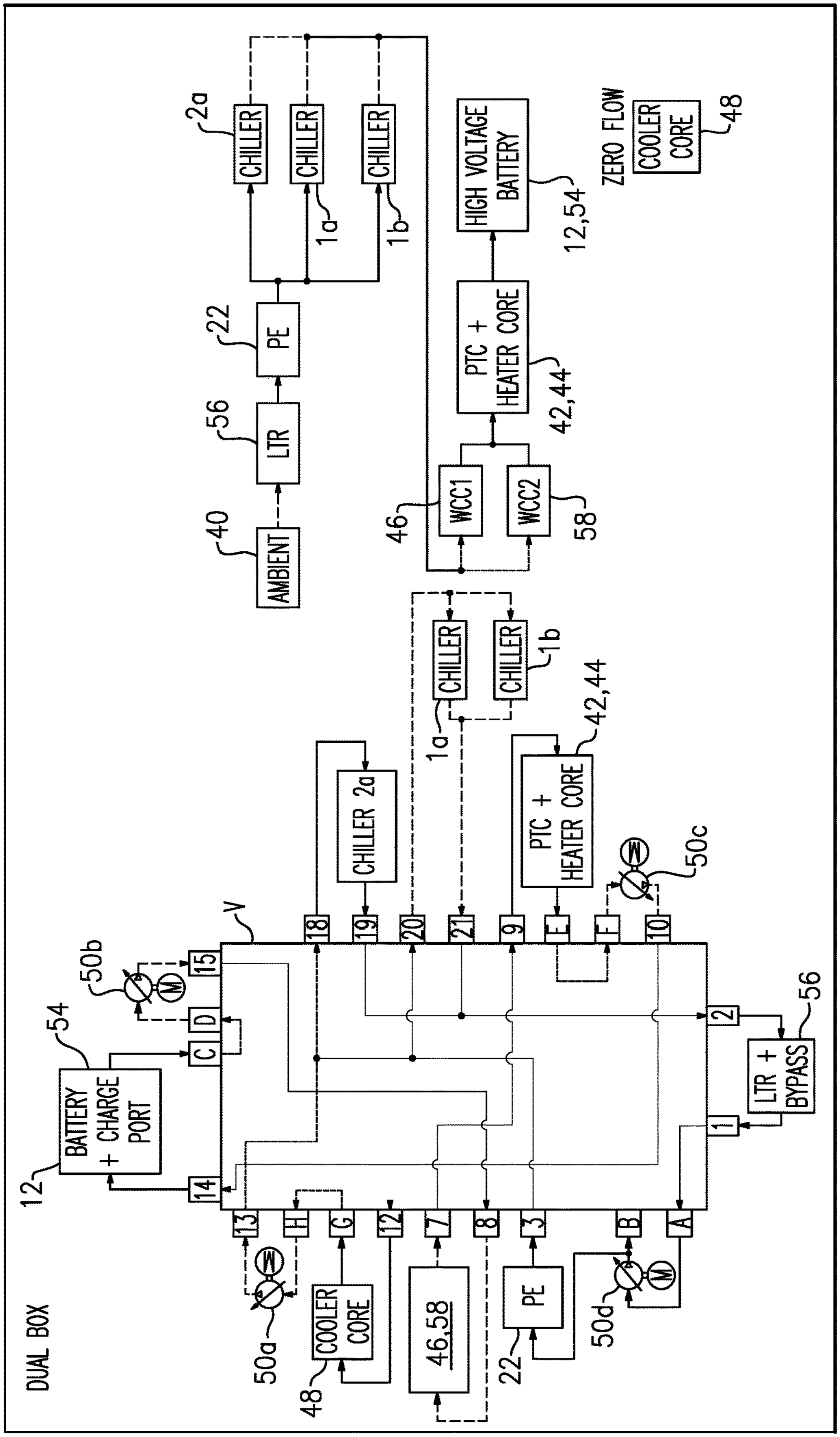
FIG. 13B is an example of the valve state of FIG. 13A for the second configuration.

FIGS. 13A-B show one example of Valve State H. This state comprises a mode that is used to heat the battery 12 and possibly cabin 20 if conditions are met. The heat may be directly from a PTC heater 44, or heat recovered from the ambient air 40 through the LTR 56 and power electronics waste heat can be transferred through two chillers in the single box system 28 or three chillers in the dual box system 30 to the WCC 46 (single box system 28) or the two water cooled condensers 46, 58 (dual box system 30) to the heater core 42 and battery 12. The heat from the heater core 42 may be restricted to enter the cabin 20 by use of an HVAC blower motor and blend doors (not shown). Valve State H applies to an ambient condition where it is considered cold, e.g. less than 20 degrees C.

As shown in the single box refrigerant system 28 of 13A, ambient air 40 drawn in from the LTR 56 feeds into port P1 which is fed into and through pump 50*d* through port PA. Flow exits the pump 50*d* and enters an inlet to the PE 22. An outlet from the PE 22 feeds into port P3 which connects to port P18 which feeds into chiller 1*b*. Chiller 1*b* feeds into port P19 which connects to port P2 as an inlet to the LTR 56. Port P3 of the PE 22 also connects to port P20 which feeds into chiller 1*a*. Chiller 1*a* feeds into port P21 which connects to port P2 as an inlet to the LTR 56. The outlet from the battery 12/charge port 54 feeds into and through pump 50*b* respectively via ports PC, PD, P15. Port P15 connects to port P8 as an inlet to the WCC 46. The outlet of the WCC 46 feeds into port P7 which connects to port P9 as an inlet to the heater core 42/PTC 44. An outlet from the heater core 42/PTC 44 feeds into port PE which is fed into and through pump 50*c* via ports PF and P10. Port P10 connects to port P14 as an inlet to the battery 12. There is no flow through the cooler core 48. Thus, in this mode (cabin and battery heating via a heat pump): heat from the PE 22 goes to chillers 1*a*, 1*b* and the LTR 56; the LTR 56 takes heat from ambient; heat from the LTR 56 goes to the PE 22 and chillers 1*a*, 1*b*; heat from the WCC 46 goes to the heater core 42 and battery 12; and the chillers 1*a*, 1*b* take heat from the LTR 56 and PE 22.

As shown in the dual box refrigerant system 30 of FIG. 13B, ambient air 40 drawn in from the LTR 56 feeds into port P1 which is fed into and through pump 50*d* through port PA. Flow exits the pump 50*d* and enters an inlet to the PE 22. An outlet from the PE 22 feeds into port P3 which connects to port P18 which feeds into chiller 2*a*. Chiller 2*a* feeds into port P19 which connects to port P2 as an inlet to the LTR 56. Port P3 of the PE 22 also connects to port P20 which feeds into chillers 1*a*, 1*b*. Chillers 1*a*, 1*b* feed into port P21 which connects to port P2 as an inlet to the LTR 56. The outlet from the battery 12/charge port 54 feeds into and through pump 50*b* respectively via ports PC, PD, P15. Port P15 connects to port P8 as an inlet to the WCCs 46, 58. The outlet of the WCCs 46, 58 feeds into port P7 which connects to port P9 as an inlet to the heater core 42/PTC 44. An outlet from the heater core 42/PTC 44 feeds into port PE which is fed into and through pump 50*c* via ports PF and P10. Port P10 connects to port P14 as an inlet to the battery 12. There is no flow through the cooler core 48. Thus, in this mode (cabin and battery heating via a heat pump): heat from the PE 22 goes to chillers 1*a*, 1*b* and the LTR 56; the LTR 56 takes heat from ambient; heat from the LTR 56 goes to the PE 22 and chillers 1*a*, 1*b*; heat from the WCCs 46, 58 goes to the heater core 42 and battery 12; and the chillers 1*a*, 1*b*, 2*a* take heat from the LTR 56 and PE 22.

Figure 14A:
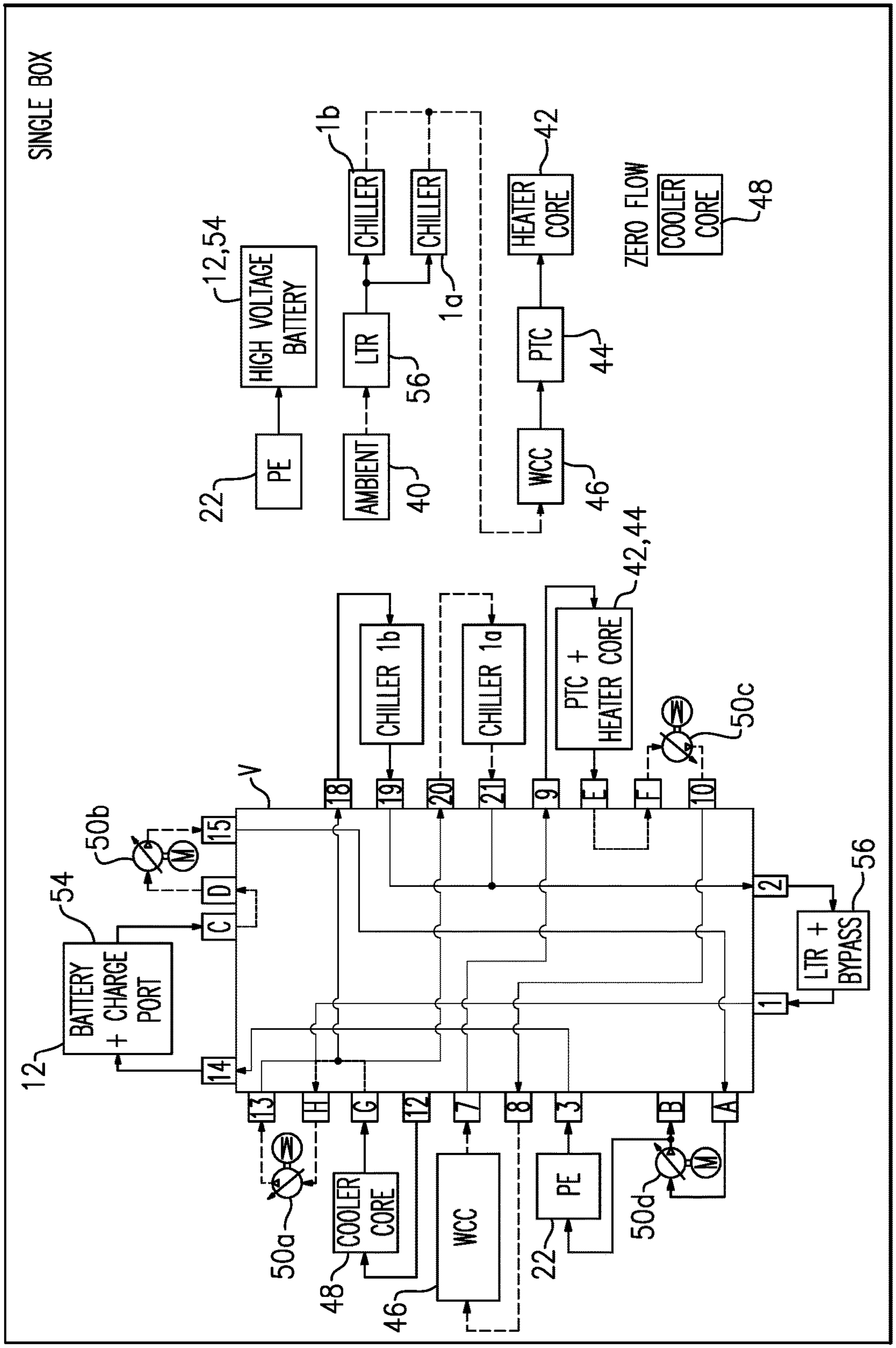
FIG. 14A is an example of another valve state for the first configuration.
Figure 14B:
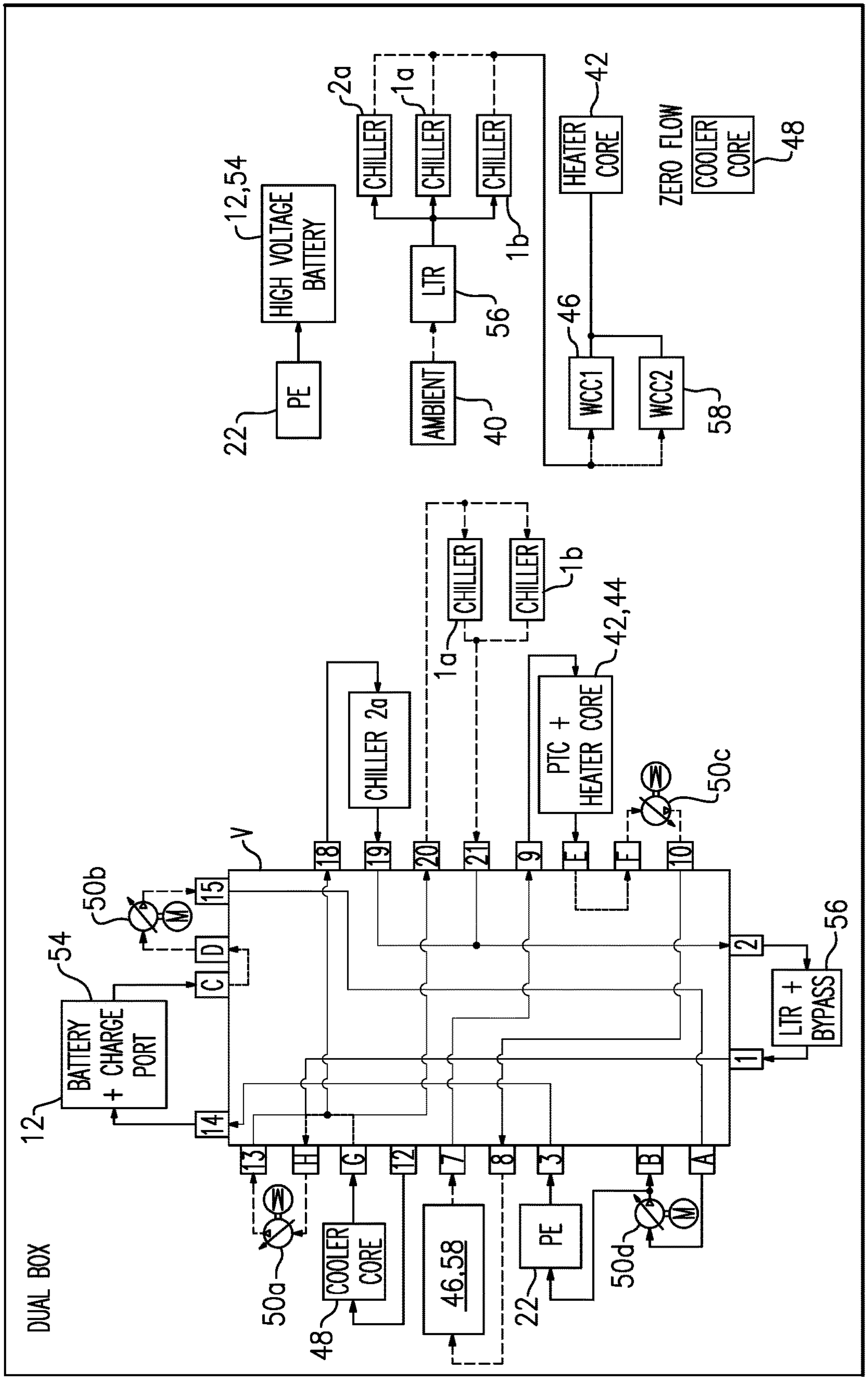
FIG. 14B is an example of the valve state of FIG. 14A for the second configuration.

FIGS. 14A-B show one example of Valve State P. This state comprises a mode that is used heat the battery 12 and heat the cabin 20. The heat may be used directly from the power electronics circuit to heat the battery 12. Heat from the ambient through the LTR 56 is used by the chillers to warm the cabin. Heat recovered from the ambient air 40 through the LTR 56 can be transferred through two chillers in a single box system 28 or three chillers in the dual box system 30 to the WCC (single box system 28) or the two water cooled condensers (dual box system 30) to the heater core 42. Valve State P applies to an ambient condition where it is considered cold, e.g. less than 20 degrees C.

As shown in the single box refrigerant system 28 of 14A, the outlet from the battery 12/charge port 54 feeds into and through pump 50*b* respectively via ports PC, PD, P15. Port P15 connects to port PA as an inlet to pump 50*d*. Pump 50*d* feeds into an inlet to PE 22 that feeds into port P3 which connects to port P 14 as an inlet to the battery 12. Ambient air 40 is drawn in through the LTR 56 and is fed into pump 50*a* via port PH. Flow exits pump 50*a* avia port P13 which connects to ports P18 and P20. These ports P18, P20 respectively feed into chillers 1*b* and 1*a*, and output from these chillers 1*b*, 1*a* respectively feed into ports P19 and P21 which connect to port P2 as an inlet to the LTR 56. The outlet from the WCC feeds into port P7 which connects to port P9 as an inlet into the PTC 44 and then the heater core 42. The outlet from the heater core 42 feeds into port PE and is then fed into and through pump 50*c* via ports PF and P10. Port P10 connects to port P8 as an inlet to WCC 46. There is no flow through cooler core 48. Thus, in this mode (cabin heating via heat pump, battery heating with PE waste heat or e-drive torque loss): the heat from the PE 22 goes to the battery 12; the LTR 56 takes heat from ambient; heat from the LTR 56 goes to chillers 1*a*, 1*b*; heat from the WCC 46 goes to the heater core 42; and the chillers 1*a*, 1*b* take heat from the LTR 56.

As shown in the dual box refrigerant system 30 of FIG. 14B, the outlet from the battery 12/charge port 54 feeds into and through pump 50*b* respectively via ports PC, PD, P15. Port P15 connects to port PA as an inlet to pump 50*d*. Pump 50*d* feeds into an inlet to PE 22 that feeds into port P3 which connects to port P14 as an inlet to the battery 12. Ambient air 40 is drawn in through the LTR 56 and is fed into pump 50*a* via port PH. Flow exits pump 50*a* avia port P13 which connects to ports P18 and P20. Port P18 feeds into chiller 2A. Port P20 feeds into chillers 1*a*, 1*b*. The output from these chillers feed into ports P19 and P21 which connect to port P2 as an inlet to the LTR 56. The outlet from the WCCs 46, 58 feeds into port P7 which connects to port P9 as an inlet into the PTC 44 and then the heater core 42. The outlet from the heater core 42 feeds into port PE and is then fed into and through pump 50*c* via ports PF and P10. Port P10 connects to port P8 as an inlet to WCC 46. There is no flow through cooler core 48. Thus, in this mode (cabin heating via heat pump, battery heating with PE waste heat or e-drive torque loss): the heat from the PE 22 goes to the battery 12; the LTR 56 takes heat from ambient; heat from the LTR 56 goes to chillers 1*a*, 1*b*; heat from the WCCs 46, 58 goes to the heater core 42; and the chillers 1*a*, 1*b*, 2*a* take heat from the LTR 56.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system comprising:
- a coolant system that is in fluid communication with power electronics, a battery pack, and a cabin;
- a refrigerant system that only interfaces with coolant from the coolant system;
- wherein the coolant system and the refrigerant system together form a thermal management system that interfaces with a coolant based low temperature radiator that exhausts heat to and draws heat from ambient; and
- a valve that is associated with a first configuration or a second configuration, and wherein:
  - in the first configuration, the valve is in fluid communication with the battery pack, the power electronics, a cooler core, a heater core, at least a first chiller and a second chiller, at least one water cooled condenser, and the coolant based low temperature radiator; and
  - in the second configuration, the valve is in fluid communication with the battery pack, the power electronics, a cooler core, a heater core, at least a first chiller, a second chiller and a third chiller, at least a first water cooled condenser and a second water cooled condenser, and the coolant based low temperature radiator.

2. The system according to claim 1, wherein the valve comprises the only valve that is used in the first configuration and the second configuration.

3. The system according to claim 1, wherein the valve is operational in a plurality of different valve states, and including a controller that controls the valve to manage heat transfer for the plurality of different valve states based on input from a plurality of sensors.

4. The system according to claim 3, wherein one of the plurality of different valve states comprises a DC fast charge mode when the cabin does not have a request for heating or cooling, and wherein:
- the first chiller and the second chiller are used to cool the battery pack via the refrigerant system when in the first configuration, and
- the first chiller, the second chiller and the third chiller are used to cool the battery pack via the refrigerant system when in the second configuration.

5. The system according to claim 3, wherein one of the plurality of different valve states comprises a cabin cooling and battery cooling mode, and wherein:
- one of the first chiller and the second chiller is used to cool the battery pack and another of the first chiller and the second chiller is used to cool the cabin via the cooler core when in the first configuration; and
- two of the first chiller, the second chiller and the third chiller are used to cool the cabin via the cooler core, and a remaining chiller of the first chiller, the second chiller and the third chiller is used to cool the battery pack when in the second configuration.

6. The system according to claim 3, wherein one of the plurality of different valve states comprises a cabin cooling and battery cooling mode, and wherein:
- one of the first chiller and the second chiller is used to cool the battery pack and another of the first chiller and the second chiller is used to cool the cabin via the cooler core when in the first configuration; and
- two of the first chiller, the second chiller and the third chiller are used to cool the battery pack, and a remaining chiller of the first chiller, the second chiller and the third chiller is used to cool the cabin via the cooler core when in the second configuration.

7. The system according to claim 3, wherein one of the plurality of different valve states comprises a cabin cooling and battery recirculation mode, and wherein:
- the first chiller and the second chiller are used to cool the cabin via the cooler core when in the first configuration; and
- the first chiller, the second chiller, and the third chiller are used to cool the cabin via the cooler core when in the second configuration.

8. The system according to claim 3, wherein one of the plurality of different valve states comprises a cabin-active cooling and a battery-passive cooling mode, and wherein:
- the coolant based low temperature radiator is used to cool the battery pack and power electronics, one of the first chiller and second chiller is used to cool the power electronics and battery pack, and the other of the first chiller and the second chiller is used to cool the cabin when in the first configuration; and
- the coolant based low temperature radiator is used to cool the battery pack and power electronics, two of the first chiller, the second chiller and the third chiller are used to cool the cabin via the cooler core, a remaining chiller of the first chiller, the second chiller and the third chiller is used to cool the power electronics and battery pack when in the second configuration.

9. The system according to claim 4, wherein one of the plurality of different valve states comprises a dehumidification with battery heating/cooling or cabin heating with battery cooling, and wherein:
- when in the first configuration
  - the coolant based low temperature radiator is used to cool the battery pack and power electronics,
  - one of the first chiller and second chiller is used to cool the power electronics and battery pack,
  - heat from the power electronics, the battery pack, and the coolant based low temperature radiator is transferred from at least one of the first and second chillers to the water cooled condenser through the refrigerant system to warm the cabin if needed,
  - the cabin is dehumidified by being cooled by one of the first and second chillers if needed, and
  - the heater core is used simultaneously via heat from the water cooled condenser to compensate for cabin cooling if needed; and
- when in the second configuration the coolant based low temperature radiator is used to cool the battery pack and power electronics, one of the first chiller and second chiller is used to cool the power electronics and battery pack, heat from the power electronics, the battery pack, and the coolant based low temperature radiator is transferred from at least one of the first and second chillers to the water cooled condenser through the refrigerant system to warm the cabin if needed, the cabin is dehumidified by being cooled by two of the first, second and third chillers if needed, and the heater core is used simultaneously via heat from the water cooled condenser to compensate for cabin cooling if needed.

10. The system according to claim 3, wherein one of the plurality of different valve states comprises at least a battery heating and a cabin heating mode if predetermined conditions are satisfied, and wherein:

heat is transferred directly from a PTC heater to the battery pack, or heat recovered from ambient air through low temperature coolant based radiator and power electronics waste heat is transferred through the first and second chillers to the at least one water cooled condenser and then to the heater core and battery pack when in the first configuration; and heat is transferred directly from the PTC heater, or heat recovered from ambient air through the low temperature coolant based radiator and power electronics waste heat is transferred through the first, second and third chillers to the first and second water cooled condensers and then to the heater core and battery pack, when in the second configuration.

11. The system according to claim 3, wherein one of the plurality of different valve states comprises cabin and battery heating mode, and wherein:

heat from the power electronics to directly heat the battery pack, heat recovered from ambient air through the coolant based low temperature radiator and power electronics waste heat is transferred through the first and second chillers to the at least one water cooled condenser and then to the heater core when in the first configuration; and heat from the power electronics to directly heat the battery pack, heat recovered from ambient air through the coolant based low temperature radiator and power electronics waste heat is transferred through the first, second and third chillers to the first and second water cooled condensers and then to the heater core when in the second configuration.

12. The system according claim 1, including a plurality of pumps comprising at least a first pump positioned immediately downstream of the battery pack, a second pump positioned immediately downstream of the heater core, a third pump positioned immediately downstream of the coolant based low temperature radiator, and a fourth pump positioned immediately downstream of the cooler core.

13. A method comprising:

providing a coolant system that is in fluid communication with power electronics, a battery pack, and a cabin;

providing a refrigeration system that only interfaces with coolant from the coolant system;

combining the coolant system and the refrigerant system to form a thermal management system that interfaces with a coolant based low temperature radiator that exhausts heat to and draws heat from ambient; and associating a valve that a first configuration or a second configuration, and further including:

in the first configuration, fluidly communicating the valve with the battery pack, the power electronics, a cooler core, a heater core, at least a first chiller and a second chiller, at least one water cooled condenser, and the coolant based low temperature radiator; and in the second configuration, fluidly communicating the valve with the battery pack, the power electronics, a cooler core, a heater core, at least a first chiller, a second chiller and a third chiller, at least a first water cooled condenser and a second water cooled condenser, and the coolant based low temperature radiator.

14. The method according to claim 13, wherein the valve comprises the only valve that is used in the first configuration and the second configuration.

15. The method according to claim 13, positioning at least a first pump immediately downstream of the battery pack, a second pump immediately downstream of the heater core, a third pump immediately downstream of the coolant based low temperature radiator, and a fourth pump immediately downstream of the cooler core.

16. The method according to claim 13, wherein the valve is operational in a plurality of different valve states, and including controlling the valve to manage heat transfer for the plurality of different valve states based on input from a plurality of sensors.

17. The method according to claim 16, wherein one of the plurality of different valve states comprises at least a battery heating and a cabin heating mode if predetermined conditions are satisfied, and including:

when in the first configuration, transferring heat directly from a PTC heater to the battery pack, or transferring heat recovered from ambient air through the coolant based low temperature radiator and power electronics waste heat through the first and second chillers to the at least one water cooled condenser and then to the heater core and battery pack; and when in the second configuration, transferring heat directly from the PTC heater to the battery pack, or transferring heat recovered from ambient air through the coolant based low temperature radiator and power electronics waste heat through the first, second and third chillers to the first and second water cooled condensers and then to the heater core and battery pack.

18. The method according to claim 16, wherein one of the plurality of different valve states comprises cabin and battery heating mode, and including:

when in the first configuration, using heat from the power electronics to directly heat the battery pack, and transferring heat recovered from ambient air through the coolant based low temperature radiator and power electronics waste heat through the first and second chillers to the at least one water cooled condenser and then to the heater core; and when in the second configuration, using heat from the power electronics to directly heat the battery pack, and transferring heat recovered from ambient air through the coolant based low temperature radiator and power electronics waste heat through the first, second and third chillers to the first and second water cooled condensers and then to the heater core.

* * * * *